United States Patent
Nagasaka et al.

(10) Patent No.: US 9,342,584 B2
(45) Date of Patent: May 17, 2016

(54) SERVER APPARATUS, INFORMATION TERMINAL, AND PROGRAM

(71) Applicant: Sony Corporation, Tokyo (JP)

(72) Inventors: Hideo Nagasaka, Kanagawa (JP); Tomonori Misawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 337 days.

(21) Appl. No.: 13/681,868

(22) Filed: Nov. 20, 2012

(65) Prior Publication Data

US 2013/0144891 A1    Jun. 6, 2013

(30) Foreign Application Priority Data

Dec. 1, 2011  (JP) ................. 2011-263370

(51) Int. Cl.
| | |
|---|---|
| G06F 17/30 | (2006.01) |
| H04N 21/25 | (2011.01) |
| H04N 21/4788 | (2011.01) |
| H04N 21/2665 | (2011.01) |
| H04N 21/435 | (2011.01) |
| H04N 21/482 | (2011.01) |
| H04N 21/81 | (2011.01) |
| H04N 21/84 | (2011.01) |
| H04N 21/4782 | (2011.01) |

(52) U.S. Cl.
CPC ...... *G06F 17/30634* (2013.01); *G06F 17/3064* (2013.01); *G06F 17/30616* (2013.01); *H04N 21/251* (2013.01); *H04N 21/2665* (2013.01); *H04N 21/435* (2013.01); *H04N 21/4788* (2013.01); *H04N 21/4828* (2013.01); *H04N 21/8133* (2013.01); *H04N 21/84* (2013.01); *H04N 21/4782* (2013.01)

(58) Field of Classification Search
CPC ............... G06F 17/30657; G06F 17/30321; G06F 17/3053; G06F 17/30864; G06F 17/30336; G06F 17/30684; G06F 17/30619; G06F 17/30622; G06F 17/30861; G06F 17/30634; G06F 17/3064; G06F 17/30616; H04N 21/45; H04N 21/25; H04N 21/4788; H04N 21/251; H04N 21/2665; H04N 21/4828; H04N 21/8133
See application file for complete search history.

(56) References Cited

U.S. PATENT DOCUMENTS

| | | | |
|---|---|---|---|
| 2007/0214488 A1* | 9/2007 | Nguyen et al. ................ | 725/134 |
| 2008/0167872 A1* | 7/2008 | Okimoto ................ | G10L 15/22 704/251 |
| 2008/0266449 A1* | 10/2008 | Rathod et al. ................ | 348/468 |
| 2012/0284343 A1* | 11/2012 | Lee et al. ...................... | 709/206 |

(Continued)

FOREIGN PATENT DOCUMENTS

| | | |
|---|---|---|
| JP | 2011-035628 A | 2/2011 |
| WO | WO 2011017316 A1 * | 2/2011 |

*Primary Examiner* — James E Richardson
(74) *Attorney, Agent, or Firm* — Hazuki International, LLC

(57) ABSTRACT

Provided is a server apparatus, including: keyword storage capable of storing event-identification information and one or more keywords in relation to each other, the event-identification information identifying an event, the one or more keywords relating to the event; and a first keyword-registering section configured to obtain event-identification information and detailed information from an event-information registering server, the event-identification information identifying an event, the detailed information being on the event, to extract one or more first keywords from the obtained detailed information, and to register the one or more extracted first keywords and the event-identification information in relation to each other in the keyword storage.

10 Claims, 25 Drawing Sheets

(56) References Cited

U.S. PATENT DOCUMENTS

2012/0291070 A1* 11/2012 Feng et al. ............ 725/40
2012/0303637 A1* 11/2012 Carmel et al. ............ 707/749
2013/0036124 A1* 2/2013 Ambwani et al. ............ 707/749
2013/0125172 A1* 5/2013 Suh et al. ............ 725/46
2013/0326406 A1* 12/2013 Reiley et al. ............ 715/810
2014/0067825 A1* 3/2014 Oztaskent et al. ............ 707/748

* cited by examiner

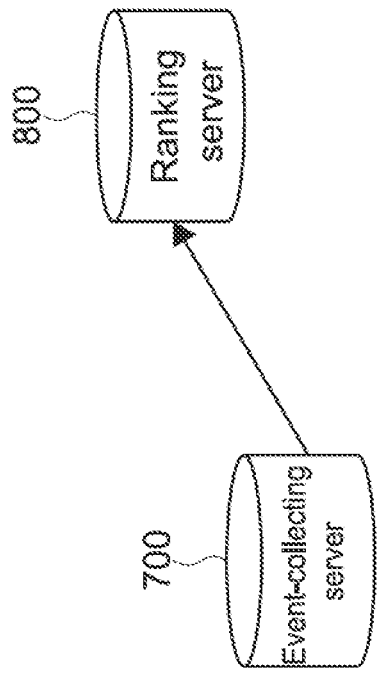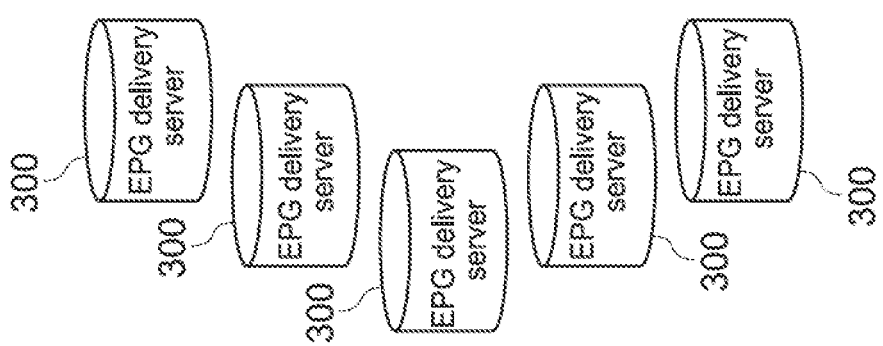
FIG. 17

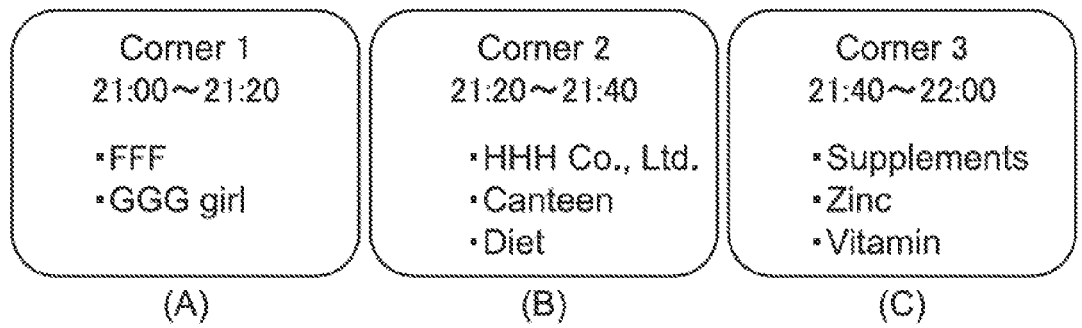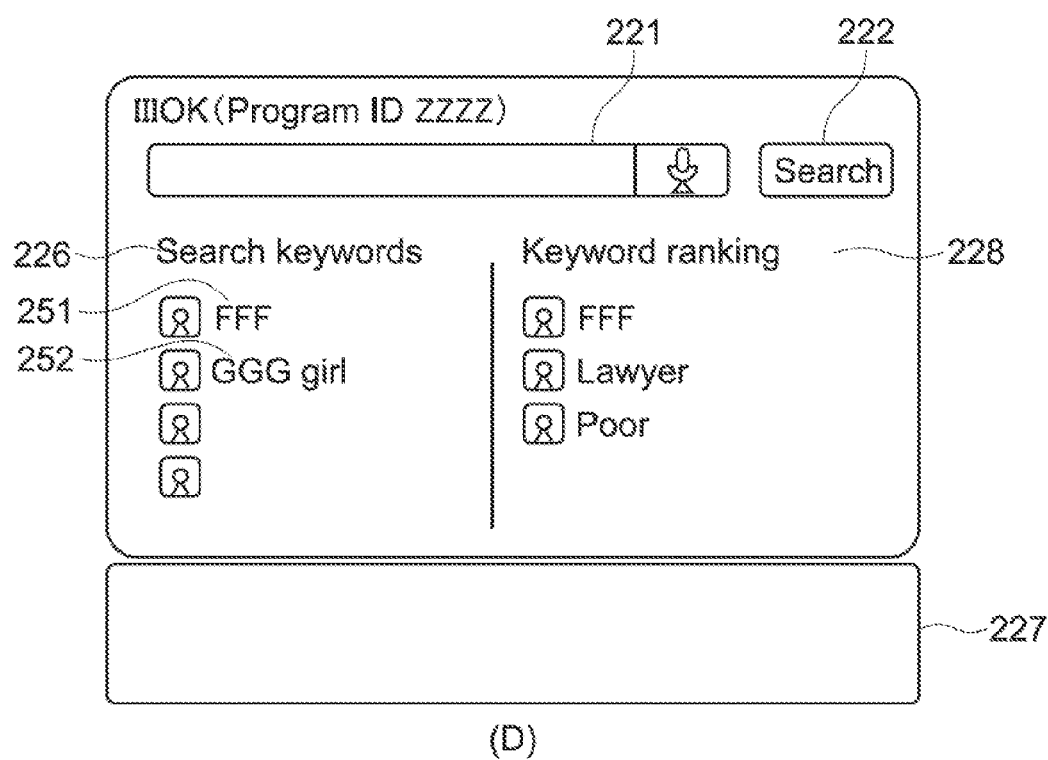
FIG.24

SERVER APPARATUS, INFORMATION TERMINAL, AND PROGRAM

CROSS-REFERENCE TO RELATED APPLICATION

The present application claims priority from Japanese Patent Application No. JP 2011-263370 filed in the Japanese Patent Office on Dec. 1, 2011, the entire content of which is incorporated herein by reference.

BACKGROUND

The present disclosure relates to an information terminal configured to access community websites, in which other users share users' postings in real time. The present disclosure further relates to a server apparatus configured to deliver search keywords to the information terminal. The present disclosure further relates to a program.

In recent years, there are known community websites, in which general-public users are capable of sharing users' postings via the Internet, in real time and on a large scale. "Twitter (registered trademark)" is one of such community websites. In "Twitter (registered trademark)", for example, a user's comments are input (i.e., "posted") in the user's homepage. The posted comments are added to the user's homepage time-orientedly. The user is capable of viewing the posted comments in real time.

Such a community website is used in the following manner, for example. A user watches a program such as a TV show. A particular episode takes place in the program, and the user is interested in the episode. Then, the user posts his comment on the episode during the broadcasting hours of the program. In this manner, the user transmits his opinion and remark about the program, which the user is watching, in real time. In such a community website, a user is capable of viewing a list of comments, which are posted by general-public users watching the same program, in real time. For example, in "Twitter (registered trademark)", it is possible to retrieve a timeline list of comments each including a text with a "hashtag (#)", by using a search window. In other words, comments each including a text (broadcast-station's name) with a "hashtag" are searched for. Then, it is possible to retrieve a timeline list of comments each including the broadcast-station's name with a "hashtag". It is possible to view various opinions by users, who are watching programs delivered from the particular broadcast station, in real time.

SUMMARY

However, comments each including a text with a "hashtag" do not always relate to an episode, in which a user is interested, closely. For example, a user wishes to view posted comments about a particular person, who appears on a particular program that the user is now watching. In such a case, if a text with a "hashtag" is a broadcast-station's name, the broadcast-station's name is too broad as a search target. Further, some users would like many people to view their comments. Some of those users add many keywords with "hashtags" to comments, even if the keywords do not relate to the comment at all. An example of such keywords is, for example, broadcast-station's name, which may be searched for by many users. In this case, a user searches for comments by using a text with a "hashtag". Then, comments, which relate to an episode in which a user is interested in a program that the user is now watching, may be retrieved. However, in addition, comments, which do not relate to the episode, may also be retrieved.

Japanese Patent Application Laid-open No. 2011-35628 discloses the following technology in order that a user may easily search for a keyword, which relates to a program that the user is now watching. That is, text information, which is included in program information and other information on a program that a user is watching, coincides with particular keywords. The number of searching for the particular keywords are rapidly increased in the Internet. In this case, the keywords, which coincide with the text information, are displayed on a screen of an information terminal. A user selects one of the displayed keywords. Then, a search result, which relates to the selected keyword, is displayed. However, according to this technology, candidates for keywords are limited to text information included in program information and other information. However, a keyword, which relates to an episode in which a user is interested, is not always included in program information. That is, the following situation may occur. A keyword, which relates to an episode in which a user is interested, is not included in program information. In this case, it is not possible to provide a keyword, in which the user is interested.

In view of the above-mentioned circumstances, it is desirable to enhance the convenience in posting comments on an SNS site by users, and in searching for posted comments.

According to an embodiment of the present technology, there is provided a server apparatus, including: keyword storage capable of storing event-identification information and one or more keywords in relation to each other, the event-identification information identifying an event, the one or more keywords relating to the event; and a first keyword-registering section configured to obtain event-identification information and detailed information from an event-information registering server, the event-identification information identifying an event, the detailed information being on the event, to extract one or more first keywords from the obtained detailed information, and to register the one or more extracted first keywords and the event-identification information in relation to each other in the keyword storage.

In this manner, it is possible to supply keywords in relation to an event to an information terminal as candidates for a comment-search keyword, which is used to search for comments posted on an SNS server. Because of this, it is possible to provide keywords, which a user of an information terminal who joins in a particular event is likely to search for, as candidates for a comment-search keyword, to the user of the information terminal. As a result, there is no need to manually input a comment-search keyword, and user-friendliness is improved.

The server apparatus may further include a second keyword-registering section configured to obtain one or more comments from an SNS server, the one or more comments each including the one or more extracted first keywords, to extract one or more second keywords from the one or more obtained comments, and to register the one or more second keywords in relation to the event-identification information in the keyword storage.

In this manner, link information, which indicates that a first keyword is equivalent to a second keyword, is established. As a result, it is possible to provide semantically-equivalent words to a user as candidates for a comment-search keyword, irrespective of the kinds of words.

The event-information registering server may be an EPG server managing an electronic program guide, and the first keyword-registering section may be configured to obtain program identification information as the event-identification information from the EPG server, the program identification information identifying a program, and to obtain detailed information on the program as the detailed information.

Detailed information on a program is obtained from an EPG server as detailed information on an event. Because of this, it is possible to prepare keywords before the event starts.

The server apparatus may further include a third keyword-registering section configured to obtain a first keyword-registering request from the information terminal, the first keyword-registering request including a comment-search keyword and the event-identification information, the comment-search keyword being input to search for a comment posted on the SNS server by a user, and to register, when obtaining the first keyword-registering request, the comment-search keyword and the event-identification information in relation to each other in the keyword storage, the comment-search keyword being included in the first keyword-registering request.

In this manner, comment-search keywords, which are input by general-public users, are stored in a server apparatus. As a result, it is possible to supply keywords, in which general-public users who join in the same event are interested, to information terminals of users who join in the same event.

The server apparatus may further include a fourth keyword-registering section configured to obtain a second keyword-registering request from the information terminal, the second keyword-registering request including one or more keywords and the event-identification information, the one or more keywords being extracted from a comment posted on the SNS server by a user, and to register, when obtaining the second keyword-registering request, one or more keywords and the event-identification information in relation to each other in the keyword storage, the one or more keywords being extracted from the comment, the one or more keywords being included in the second keyword-registering request.

In this manner, keywords, which are extracted from comments posted by general-public users, are stored in a server apparatus. As a result, it is possible to supply keywords, in which general-public users who join in the same event are interested, to information terminals of users who join in the same event.

Each of the first, second, third, and fourth keyword-registering sections may be configured to register a keyword corresponding to the event in the keyword storage for each corner, the corner being obtained by temporally dividing one event.

In this manner, it is possible to supply keywords, which relate to matters to which many users pay attention, to an information terminal for each corner of one event. It is possible to use the keywords right away to post a comment on an SNS page, and to search for posted comments.

The server apparatus may further include: a keyword-ranking creating section configured to count the registration-request number for each keyword in a past predetermined period for each event-identification information with reference to the keyword storage, and to create a keyword ranking based on a predetermined number of top keywords; and keyword ranking storage capable of storing the event-identification information and the keyword ranking in relation to each other. The keyword-ranking creating section may be configured to register the created keyword ranking and the event-identification information in relation to each other in the keyword ranking storage.

In this manner, it is possible to supply a real-time ranking of keywords, which are registered in relation to an event ID, to an information terminal. Because of this, keywords from a large number of information terminals are registered, and a large number of keywords are registered in a keyword list. In this case, if a user refers to the keyword ranking, the user may know keywords, in which general-public users who join in the same event are interested. Further, a keyword ranking is created only based on keywords registered in a past predetermined period. Because of this, a server apparatus only has to carry out a small amount of operation.

The keyword-ranking creating section may be configured to create a keyword ranking corresponding to the event for each corner, the corner being obtained by temporally dividing one event.

In this manner, it is possible to supply keywords, which relate to matters to which many users pay attention, to an information terminal for each corner of one event. It is possible to use the keywords right away to post a comment on an SNS page, and to search for posted comments.

The server apparatus may further include a keyword providing section configured to receive a keyword-obtaining request from an information terminal, the keyword-obtaining request including event-identification information, the event-identification information identifying an event in which a user of the information terminal joins, and to provide, when receiving the keyword-obtaining request, the event-identification information and the keyword to a keyword delivery server, the event-identification information and the keyword being registered in relation to each other in the keyword storage, the keyword delivery server being configured to retrieve one or more keywords in relation to the event-identification information, and to send the one or more keywords to the information terminal in reply, the one or more keywords being candidates for a comment-search keyword, the comment-search keyword being used to search for a comment posted on an SNS server.

It is possible to provide keywords in relation to an event, in which a user joins, to the user as candidates for a comment-search keyword, which is used to search for comments posted on an SNS server. Because of this, it is possible to provide keywords, which the user who joins in a particular event is likely to search for, as candidates for a comment-search keyword, to the user. As a result, there is no need to manually input a comment-search keyword, and user-friendliness is improved.

The keyword providing section may be configured to provide the event-identification information and the keyword ranking to the keyword delivery server, the event-identification information and the keyword ranking being registered in relation to each other in the keyword ranking storage.

According to an embodiment of the present technology, there is provided an information terminal, including: a keyword obtaining section configured to obtain one or more keywords, the one or more keywords being in relation to event-identification information, the event-identification information identifying an event in which a user joins, the one or more keywords being opened by a server apparatus, the server apparatus including keyword storage capable of storing event-identification information and the one or more keywords in relation to each other, the event-identification information identifying an event, the one or more keywords relating to the event, and a first keyword-registering section configured to obtain event-identification information and detailed information from an event-information registering server, the event-identification information identifying an event, the detailed information being on the event, to extract one or more first keywords from the obtained detailed information, and to register the one or more extracted first keywords and the event-identification information in relation to each other in the keyword storage; a providing section configured to provide the obtained keywords to a user, the keywords being candidates for a comment-search keyword, the comment-search keyword being used to search for a comment posted on an SNS server; and a search request section configured to supply a search request to the SNS server, the search request including a comment-search keyword, the comment-search keyword being selected from the provided candidates by a user.

The keyword obtaining section may be configured to send a keyword-obtaining request to a keyword delivery server, the keyword-obtaining request including event-identification information, the event-identification information identifying the event in which a user joins, and to obtain one or more keywords as candidates for a comment-search keyword, the one or more keywords relating to the event-identification information, the comment-search keyword being used to search for a comment posted on an SNS server.

The keyword obtaining section may be configured to obtain a keyword ranking from the keyword delivery server, the keyword ranking being created for each event-identification information based on a registration-request number for each keyword in a past predetermined period, the providing section may be configured to provide the keyword ranking to a user, the keyword ranking being obtained from the keyword delivery server, and the search request section may be configured to supply a search request to the SNS server, the search request including a comment-search keyword, the comment-search keyword being selected from the provided keyword ranking by a user.

The information terminal may further include a first keyword-registering request section configured to send a first keyword-registering request to the server apparatus, the first keyword-registering request including a comment-search keyword and event-identification information, the comment-search keyword being input to search for a comment posted on the SNS server by a user, the event-identification information identifying the event in which a user joins.

The information terminal may further include a second keyword-registering request section configured to extract a keyword from a comment posted on the SNS server by a user, and to send a second keyword-registering request to the server apparatus, the second keyword-registering request including the extracted keyword and the event-identification information.

According to an embodiment of the present technology, there is provided program, causing a computer to function as keyword storage capable of storing event-identification information and one or more keywords in relation to each other, the event-identification information identifying an event, the one or more keywords relating to the event; and a first keyword-registering section configured to obtain event-identification information and detailed information from an event-information registering server, the event-identification information identifying an event, the detailed information being on the event, to extract one or more first keywords from the obtained detailed information, and to register the one or more extracted first keywords and the event-identification information in relation to each other in the keyword storage.

As described above, according to the present technology, it is possible to enhance the convenience in posting comments on an SNS site by users, and in searching for posted comments.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 17 is another diagram conceptually showing how the EPG delivery server, the SNS server, the event-collecting server, and the ranking server of the third embodiment work;

FIG. 24 is a diagram for explaining a specific example of a modified example 3.

DETAILED DESCRIPTION OF EMBODIMENTS

Hereinafter, embodiments of the present disclosure will be described with reference to the drawings.

First Embodiment

Configuration of Network System

Figure 1:
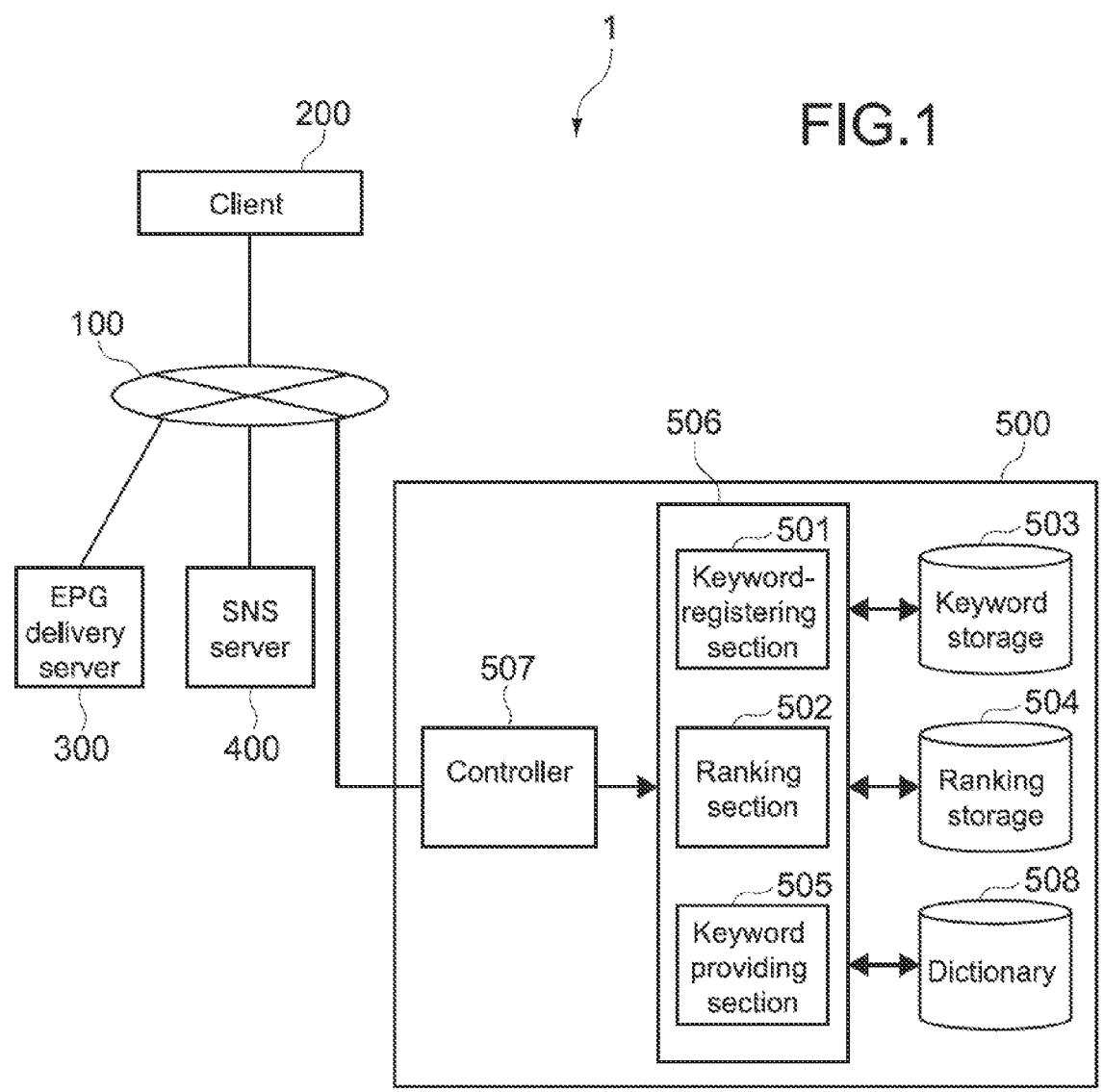
FIG. 1 is a diagram showing the configuration of a network system according to a first embodiment.

FIG. 1 is a diagram showing the configuration of a network system according to a first embodiment of the present technology.

As shown in FIG. 1, a network system 1 includes a network 100 such as the Internet, a client 200 (information terminal), an EPG (Electronic Program Guide) delivery server 300, an SNS (Social Networking Service) server 400, and a keyword server 500 (server apparatus). The client 200, the EPG delivery server 300, the SNS server 400, and the keyword server 500 are configured to connect to the network 100. Note that, according to this embodiment, a plurality of clients 200 are connected to the network 100. However, in this specification, for ease of explanation, one client 200 will be described. Further, one or more EPG delivery servers 300 and one or more SNS servers 400 may be provided. In this specification, for ease of explanation, one EPG delivery server 300 and one SNS server 400 will be described.

The SNS server 400 manages a community website. Hereinafter, one of community websites, i.e., "Twitter (registered trademark)" will be described as an example. In "Twitter (registered trademark)", for example, a user's comment is input (i.e., "posted") in the user's homepage. The posted comment is added to the user's homepage time-orientedly. The user is capable of viewing the posted comment in real time. Further, in "Twitter (registered trademark)", it is possible to retrieve a timeline list of comments each including a text with a "hashtag (#)" by using a search window.

The client 200 is configured to connect to the network 100 such as the Internet. The client 200 is configured to post a comment on an SNS site via the network 100. Further, the client 200 is configured to receive keywords from the keyword server 500 via the network 100. The keywords relate to a program, which a user is watching. The client 200 is configured to display the keywords on a screen. Here, a "program" is broadcasted from a broadcast station (not shown), or is delivered via the network 100. The "program" is a specific example of an event, in which a user joins. An event, in which a user joins, is not limited to a broadcast program as long as the start date/time is previously determined. Examples of an event, in which a user joins, include a musical concert, sports events such as the Olympics and the soccer World Cup, a festival and an event held by a state, a local government, or the like, a large-scale school event such as a university festival, and the like. In this specification, for ease of explanation, an event is limited to a program, and the description will be made.

The EPG delivery server 300 delivers information on start time of an event, detailed information on the event, and the like. In this specification, a server, which delivers detailed information on an event (broadcast program) and the like, is limited to the EPG delivery server 300, and the description will be made. The EPG delivery server 300 manages electronic program guides. However, in a case where an event is other than a broadcasted program, a server for delivering detailed information (text including keyword such as, for example, casts, theme, products available for sale, or object) on an event may be employed instead of the EPG delivery server 300.

The EPG delivery server 300 delivers start time information, detailed information, and other information on a broadcast program. The keyword server 500 is configured to obtain such information via the network 100. Further, the keyword server 500 is configured to extract keywords from detailed information, which is obtained from the EPG delivery server 300, by means of morphological analysis. The keyword server 500 is configured to send the extracted keywords to the EPG delivery server 300 via the network 100. The keyword server 500 is configured to request the EPG delivery server 300 to register the keywords.

[Outline of Embodiment]

Figure 2:
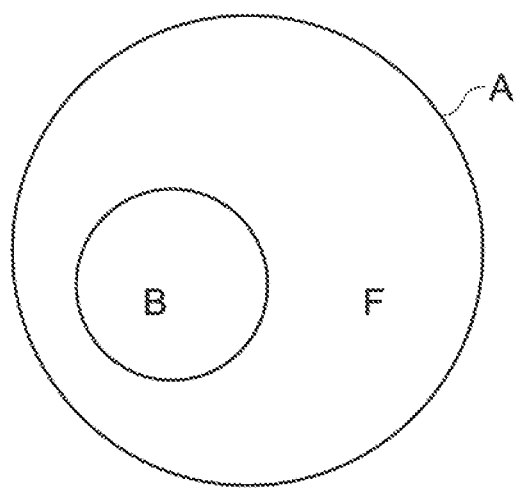
FIG. 2 is a diagram conceptually showing an outline of the network system of the first embodiment.

Next, an outline of the network system 1 of this embodiment will be described with reference to FIG. 2.

During the broadcasting hours of a program, general-public users, who is watching the program, post comments on the SNS server 400. Examples of such comments include "Who is the girl standing on MC's right in the program XXX?", "The girl is YYY, a new actress.", and the like. Here, the set A represents all the posted comments in relation to a particular program. The set A includes a set B. The set B is, for example, a set of comments each including a broadcast channel of the program with a hashtag or the like. All the comments in the set A are searched by using a search keyword with a hashtag. As a result, comments in the set B may be retrieved. However, the set A includes not only the set B but also the rest portion F. The set B includes the retrieved comments each with a hashtag. The rest portion F is not included in the set B. In the past, comments, which are out of the set B and in the rest portion F, may not be searched for easily and reliably.

For example, a user wishes to retrieve "the name of a personality on TV together with the MC of the program XXX" from posted comments. In this case, a user manually inputs keywords such as "program name", "MC's name", and "personality on TV together with MC", in addition to a hashtag indicating a broadcast station. Then, the user sends a search request. Then, the user searches for target information from comments, which are included in a search result in reply to the search request. Further, there is no problem in a case where the user knows the "program name" and "MC's name", which are manually input as search keywords. However, in a case where the user does not know them, it becomes troublesome.

In view of this, the network system 1 according to the first embodiment of the present technology realizes an environment, in which a user of the client 200 is capable of arbitrarily selecting a comment-search keyword from a plurality of words included in detailed information. An example of the detailed information is EPG data, in which information on broadcast programs are computerized.

The detailed information includes various information including proper nouns. Examples of the various information include players' names and a convention's name (in case of sports show), casts' names (in case of variety show, drama, etc.), a featured place's name (in case of travel show, etc.), a story of a the show, and the like.

Further, the network system 1 realizes an environment, in which a user of the client 200 may arbitrarily select a comment-search keyword from keywords, which are extracted from comments posted on the SNS server 400 by other users.

The keyword server 500 manages keywords, which are extracted from comments posted on the SNS server 400, in relation to event-identification information such as a program ID. Because of this, a user of the client 200 may select a comment-search keyword from one or more keywords, which are narrowed based on arbitrary event-identification information. That is, a user of the client 200 may select a comment-search keyword from words included in comments. The comments are posted by other users, who are watching the program that the user is watching. As a result, user-friendliness is increased. Specifically, a user of the client 200 wishes to search posted comments for "the name of a personality on TV together with the MC of the program XXX, which the user is now watching", for example. In this case, the user may input information such as a program name and a MC's name as comment-search keywords easily.

In addition, the keyword server 500 statistically processes keywords, which are extracted from comments posted on the SNS server 400, for each event-identification information. The keyword server 500 creates a keyword ranking. The keyword ranking is a list of keywords, which have the largest registration-request numbers in a past predetermined period. The client 200 is configured to obtain the keyword ranking from the keyword server 500. The client 200 is configured to provide the keyword ranking to a user, in addition to the keywords, which are narrowed based on event-identification information. The keyword ranking is created based on comments in a past predetermined period. A short period (about several minutes to several tens of minutes) is set as the period. As a result, posted comments, which relate to a program that a user may be watching now, are statistically reflected on the keyword ranking.

Hereinafter, the system of this embodiment will be described in detail with reference to the drawings.

[Structural Configuration of Keyword Server 500]

The keyword server 500 includes a keyword-registering section 501, a ranking section 502, keyword storage 503, ranking storage 504, a keyword providing section 505, and a dictionary 508. Programs in storage are loaded in memory. A controller 507 interprets and executes the programs to thereby implement the functional sections 501, 502, and 505 in a functional group 506. The keyword storage 503, the ranking storage 504, and the dictionary 508 are set in rewritable nonvolatile storage.

The keyword storage 503 is configured to store an event ID and one or more keywords in relation to each other. The event ID identifies an event. The keywords relate to the event.

The keyword-registering section 501 obtains an event ID identifying an event, and detailed information on the event from the EPG delivery server 300. The keyword-registering section 501 extracts one or more first keywords from the obtained detailed information. The keyword-registering section 501 registers the one or more extracted first keywords and the event ID in relation to each other to the keyword storage 503. The keyword providing section 505 is configured to open the one or more extracted first keywords.

The keyword-registering section 501 obtains one or more comments from the SNS server 400. The one or more comments include the one or more extracted first keywords. The keyword-registering section 501 extracts one or more second keywords from the one or more obtained comments. The keyword-registering section 501 registers the one or more second keywords and the event ID on the keyword storage 503 in relation to each other. The keyword providing section 505 is configured to open the one or more second keywords.

The ranking section 502 counts the registration-request number of each keyword in a past predetermined period for each event ID, with reference to the keyword storage 503. The ranking section 502 creates a keyword ranking based on the predetermined number of keywords, whose registration-request numbers are the largest.

The ranking storage 504 is configured to store the event ID and the keyword ranking in relation to each other.

The ranking section 502 registers the created keyword ranking and the event ID on the ranking storage 504 in relation to each other. The keyword providing section 505 is configured to open the created keyword ranking.

[Behaviors]

Next, how the client 200, the EPG delivery server 300, the SNS server 400, and the keyword server 500 work will be described.

According to this embodiment, the keyword server 500 obtains event information from the EPG delivery server 300. The keyword server 500 obtains posted comments from the SNS server 400. The keyword server 500 creates keywords based thereon by means of a morphological analysis. More specifically, the keyword server 500 obtains event information from the EPG delivery server 300. The keyword server 500 determines an event, which has been started, based on event start time in event information, and the like. The keyword server 500 sends a comment-search request to the SNS server 400. The comment-search request includes keywords, which are extracted from the detailed information, and an event ID. The keyword server 500 collects comments in relation to the event. Then, the keyword server 500 extracts keywords from the collected comments. The keyword server 500 registers keywords for each event ID on the keyword storage 503. In addition, the keyword server 500 creates a keyword ranking, and registers the keyword ranking on the ranking storage 504.

Figure 3:
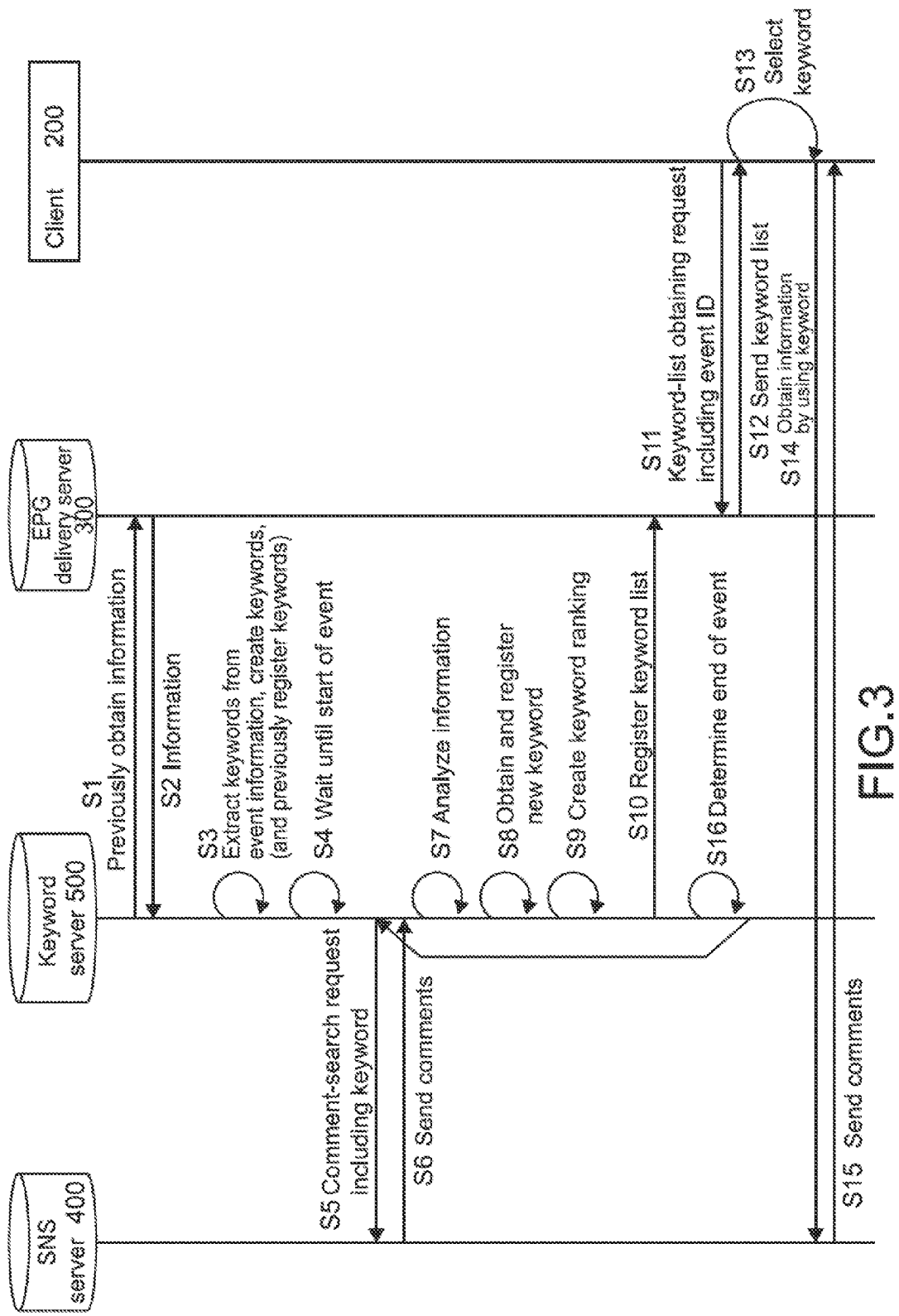
FIG. 3 is a sequence diagram showing how the network system of the first embodiment works.

FIG. 3 is a sequence diagram showing how the network system of the first embodiment works.

The keyword-registering section 501 (first keyword-registering section) of the keyword server 500 sends an event-information obtaining request to the EPG delivery server 300 (event-information registering server) (Step S1). The EPG delivery server 300 receives the obtaining request. Then, the EPG delivery server 300 extracts information from EPG data stored in the EPG delivery server 300. The information includes an event ID (program ID), a program title, detailed information on the program, start time, ending time, and the like. The EPG delivery server 300 sends an event-information reply to the keyword server 500 (Step S2). The event-information reply includes the extracted information. The keyword-registering section 501 of the keyword server 500 receives the event-information reply from the EPG delivery server 300. Then, the keyword-registering section 501 extracts one or more keywords from the detailed information in the event-information reply by means of morphological analysis. The keyword-registering section 501 registers the one or more created keywords, the event ID, the start time, the ending time, and the like on the keyword storage 503 in relation to each other time-orientedly (Step S3).

Here, the morphological analysis method will be described. The keyword-registering section 501 extracts words from detailed information on a program. The keyword-registering section 501 compares the words with the dictionary 508, to thereby determine a word class of each extracted word. Then, for example, the keyword-registering section 501 determines words, which are determined as proper nouns, as keywords. For example, event information includes the following sentence. "EEE (announcer name) reports, from her unique standpoint, unknown true faces of top swimmers and their thoughts to World Swimming Championship. BBB (swimmer name) is expected to win a gold medal and to earn the AAA Olympics berth. CCC (swimmer name) has earned eight medals in the Olympics. DDD (swimmer name) is a nice-looking guy, a world-record holder, and a star candidate for the Championship." In this case, the keyword-registering section 501 extracts proper nouns, as keywords, from words extracted from the event information. The proper nouns are "AAA Olympics", "BBB" (swimmer name), "CCC" (swimmer name), "DDD" (swimmer name), "World Swimming Championship", and "EEE" (announcer name).

The keyword-registering section 501 determines that an event starts (for example, broadcast program starts) based on event start time and the like included in the event-information reply received from the EPG delivery server 300 (Step S4). The keyword-registering section 501 reads keywords from the keyword storage 503. The read keywords are registered in relation to the event ID of the event, the start of which was determined by the keyword-registering section 501. The keyword-registering section 501 sends a comment-search request to the SNS server 400 (Step S5). The comment-search request includes the read keywords.

The SNS server 400 receives the comment-search request from the keyword server 500. Then, the SNS server 400 extracts the keywords from the comment-search request. The SNS server 400 searches for posted comments including the keywords, and for information on the comments. The information on the comments includes, for example, posting date/time, poster names, and the like. Then, the SNS server 400 sends a comment-search reply to the keyword server 500 (Step S6). The comment-search reply includes posted comments, which include the keywords extracted from the comment-search request, and information such as the posting date/time and poster names. The keyword-registering section 501 (second keyword-registering section) of the keyword server 500 receives the comment-search reply from the SNS server 400. Then, the keyword-registering section 501 extracts keywords from the posted comments, which are included in the received comment-search reply, by means of morphological analysis (Step S7). The keyword-registering section 501 registers the extracted keyword and the event ID on the keyword storage 503 in relation to each other (Step S8).

The ranking section 502 (keyword-ranking creating section) creates a keyword ranking for each event ID from the keywords registered on the keyword storage 503 in Step S3 and Step S8. The ranking section 502 records the created keyword ranking and the event ID in the ranking storage 504 in relation to each other (Step S9). Here, the keyword ranking for each event ID is information, which is updated in descending order of the registration-request number for each keyword in a past predetermined period. The ranking section 502 creates the keyword ranking for each event ID every predetermined period. The ranking section 502 updates the keyword ranking recorded in the ranking storage 504 every time the ranking section 502 creates the keyword ranking. As a result, the latest keyword ranking is always stored in the ranking storage 504.

The keyword providing section 505 reads keywords from the keyword storage 503. The read keywords are registered in relation to the event ID of the event, the start of which was determined (Step S4). In addition, the keyword providing section 505 reads a keyword ranking, which is recorded in the ranking storage 504 in relation to the event ID. Then, the keyword providing section 505 (keyword providing section) sends the read keywords and keyword ranking to the EPG delivery server 300 (keyword delivery server). The keyword providing section 505 requests the EPG delivery server 300 to register the keywords in relation to the event ID, and to register the keyword ranking in relation to the event ID (Step S10).

Meanwhile, when a user is watching a program by using the client 200 or by using an apparatus other than the client 200 (for example, television receiver (not shown)), the user wishes to post comments on scenes and casts on TV, on the SNS server 400. Then, the user accesses a web page (hereinafter, referred to as "SNS page".) for supplying an SNS service, which the SNS server 400 provides.

Figure 4:
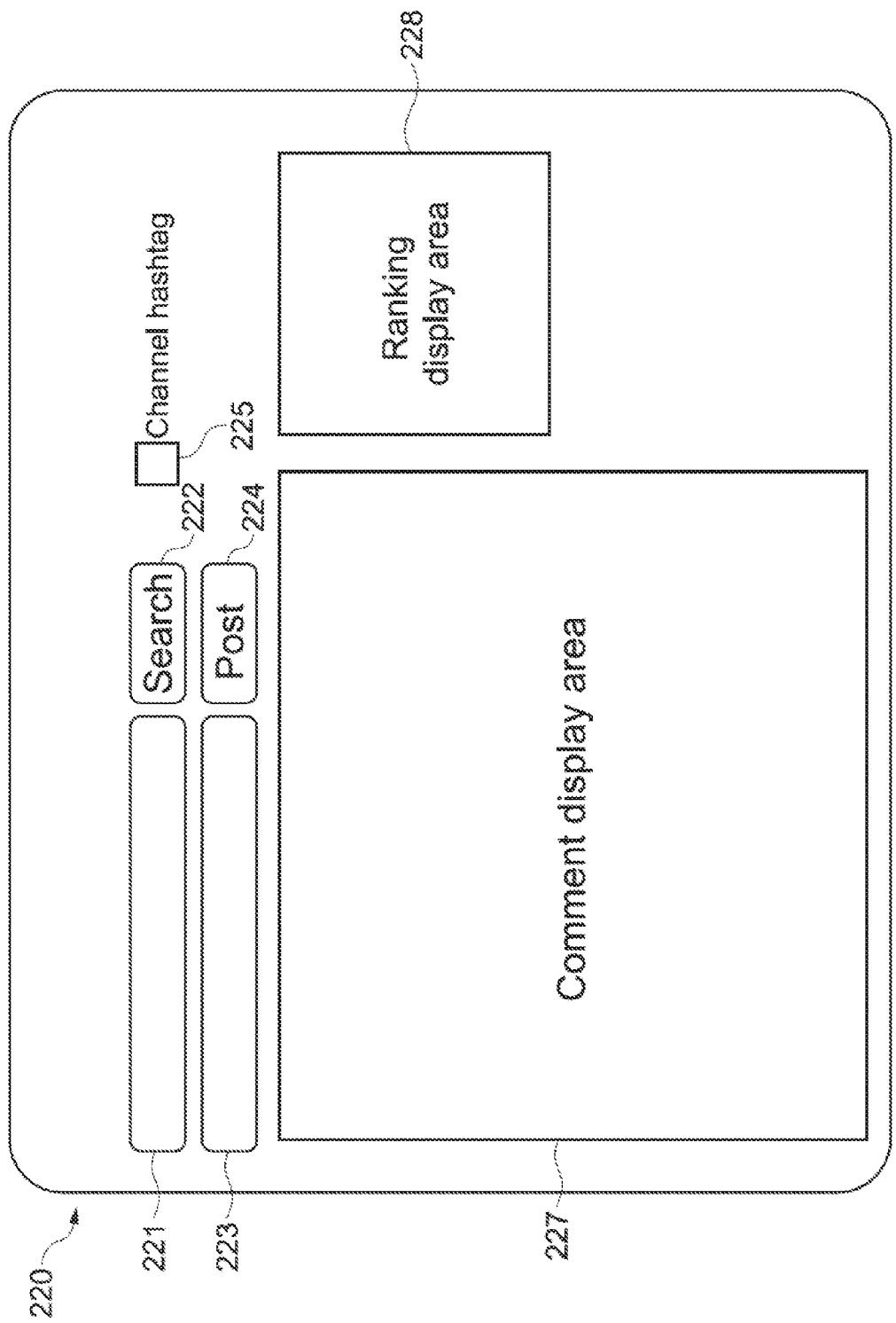
FIG. 4 is a diagram showing a layout of an SNS page.

FIG. 4 is a diagram showing a layout of the SNS page. An SNS page 220 includes, for example, a search window 221, a search button 222, a comment-input window 223, a post button 224, a channel-hashtag check box 225, a comment display area 227, a ranking display area 228, and the like. A user inputs a keyword in the search window 221 on the SNS page 220 by means of an input unit 203. The user clicks the search button 222. As a result, the user retrieves posted comments each including the keyword. The comments (search result) are time-orientedly displayed in the comment display area 227. Further, a user inputs a text (comment) in the comment-input window 223 by means of the input unit 203. The user clicks the post button 224 by means of the input unit 203. As a result, the user posts the comment on the SNS page 220. The posted comments are time-orientedly displayed in the comment display area 227. In the ranking display area 228, a keyword ranking is displayed. The keyword ranking shows a predetermined number of keywords, whose search numbers are the largest, in order. Count of the search number is reset about every several minutes to several tens of minutes, for example. As a result, the ranking display area 228 displays keywords, which relate to a matter in which many users are interested in recent several minutes to several tens of minutes.

Figure 5:
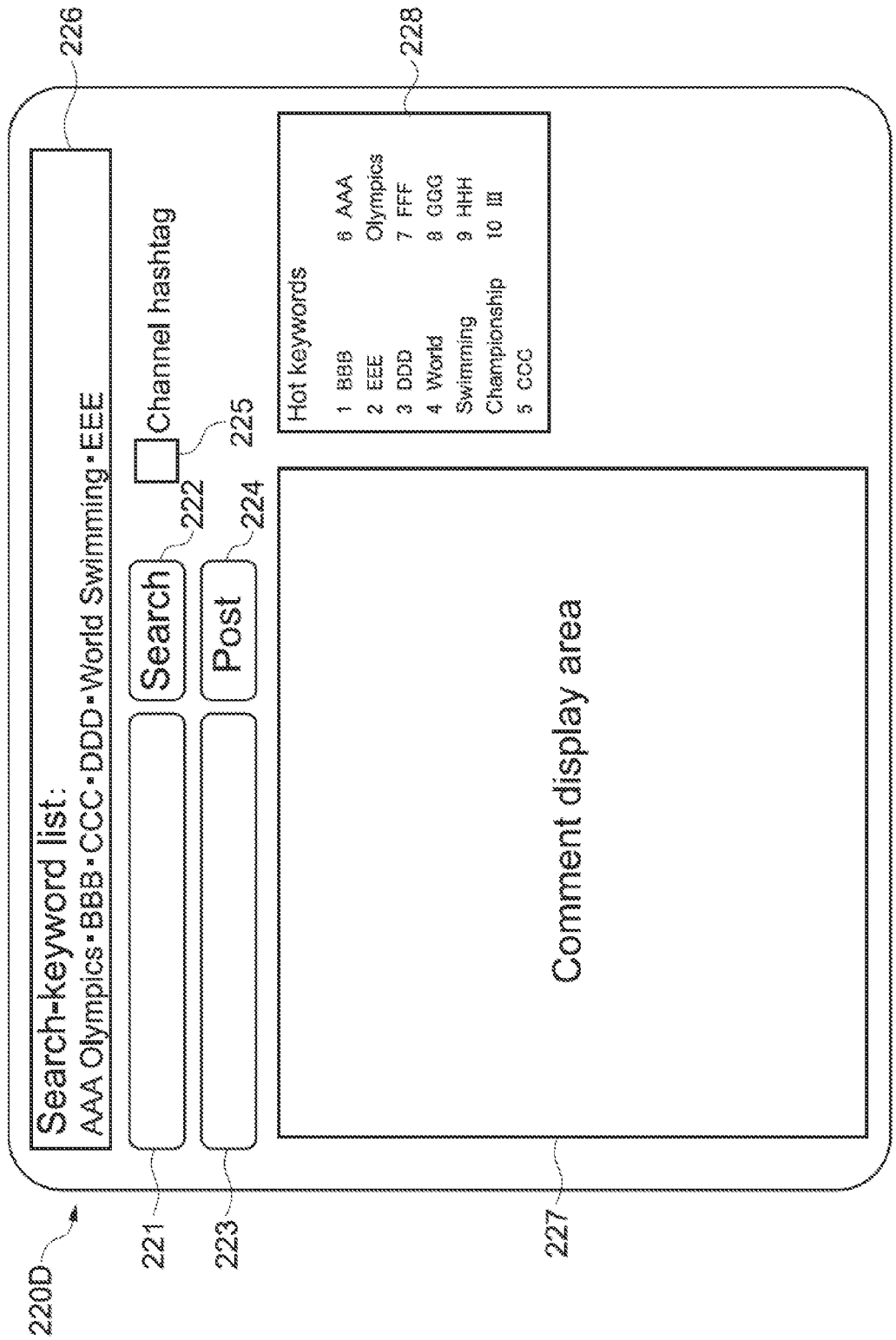
FIG. 5 is a diagram showing an example of the SNS page.

With reference to FIG. 3 again, the client 200 accesses the SNS page. Then, the client 200 determines an event ID (program ID) of the program, which the user is now watching, based on the current channel information and the current time, for example. The client 200 sends a keyword-list obtaining request to the EPG delivery server 300 (Step S11). The keyword-list obtaining request includes the event ID. The EPG delivery server 300 receives the keyword-list obtaining request from the client 200. Then, the EPG delivery server 300 extracts the event ID from the keyword-list obtaining request. The EPG delivery server 300 reads the keywords and the keyword ranking, which are registered in relation to the extracted event ID. The EPG delivery server 300 sends the keywords and the keyword ranking to the client 200 (Step S12). The client 200 obtains the keyword and the keyword ranking from the EPG delivery server 300. Then, the client 200 adds the keyword to a search-keyword list 226 as shown in FIG. 5. In addition, the client 200 displays the extracted keyword ranking in the ranking display area 228.

A user of the client 200 selects the keyword "EEE" from the search-keyword list 226 or from the ranking display area 228 (Step S13). The client 200 sends a comment-search request to the SNS server 400 (Step S14). The comment-search request includes the selected keyword.

The SNS server 400 receives the comment-search request from the client 200. The SNS server 400 extracts the keyword from the comment-search request. The SNS server 400 searches for posted comments each including the keyword, and for information such as posting date/time and poster names of the comments, for example. Then, the SNS server 400 sends a comment-search reply to the client 200 (Step S15). The comment-search reply includes the posted comments, and the information such as posting date/time and poster names.

Note that the SNS server 400 may refer to posting date/time (time stamp) of a posted comment. The SNS server 400 may send a comment-search reply to the client 200. The comment-search reply relates to comments, which are posted in a predetermined period before the receiving date/time of the comment-search request. For example, the SNS server 400 may previously obtain start date/time and ending date/time of an event from the EPG delivery server 300. The SNS server 400 may send a comment-search reply to the client 200. The comment-search reply relates to comments, which are posted during the event.

An information detection section 205 of the client 200 updates an SNS page based on the comment-search reply received from the SNS server 400, when the SNS page is displayed on a display unit 202.

Figure 6:
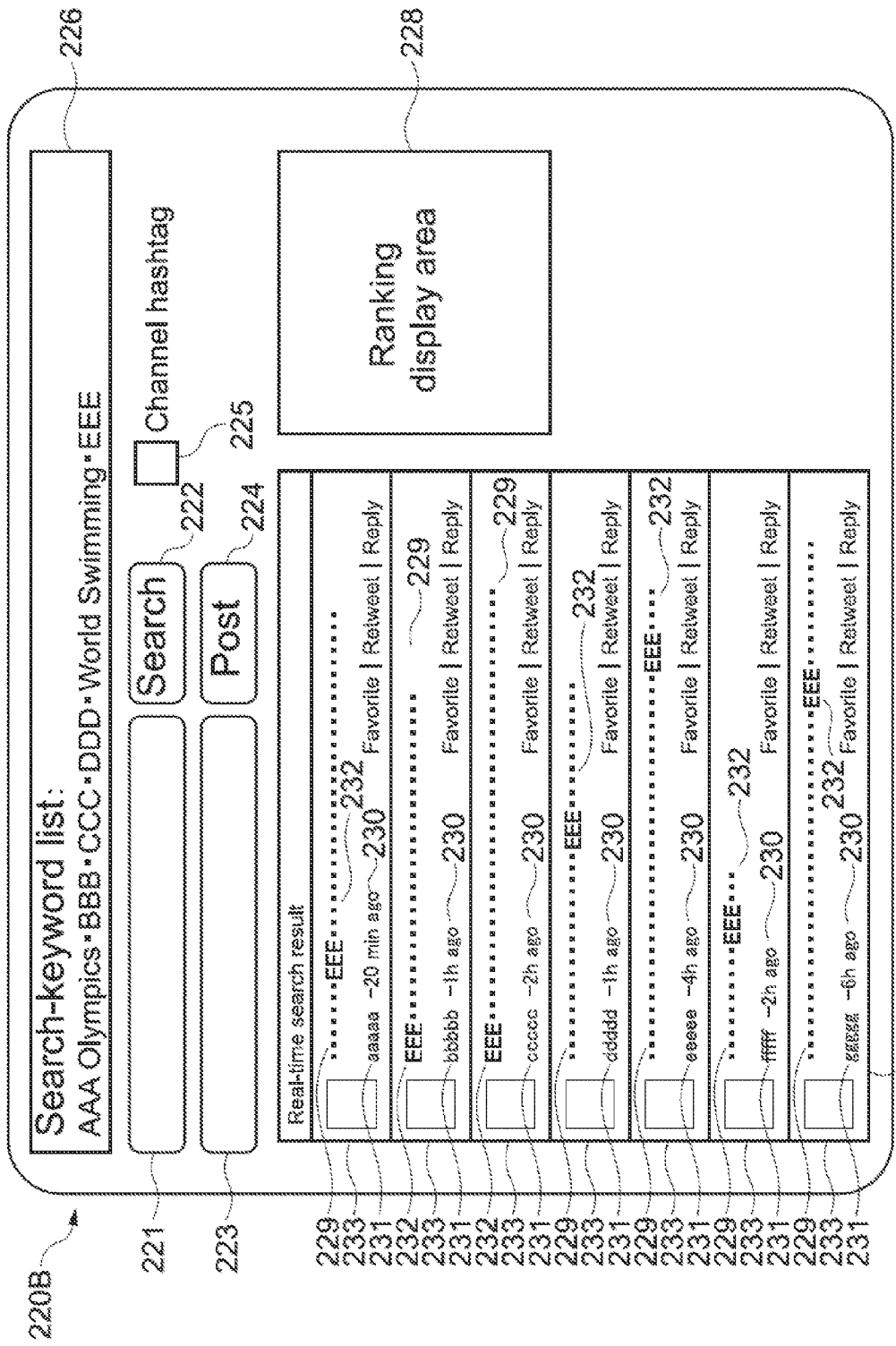
FIG. 6 is a diagram showing an example of the SNS page based on a comment-search reply.

FIG. 6 is a diagram showing an example of an SNS page based on a comment-search reply. As shown in FIG. 6, the comment-search result is displayed in the comment display area 227. Here, in the comment display area 227, search results 233 are time-orientedly displayed from top to bottom. Each of the search results 233 relates to each of the retrieved posted comments. The search result 233 for each posted comment includes a comment 229, comment posting date/time 230, a comment poster name 231, and the like. In the comment 229, a keyword 232 is highlighted. For example, the color of the word is changed.

Meanwhile, the keyword-registering section 501 of the keyword server 500 determines that the event, the start of which was determined (Step S4), ends (broadcast program ends) based on the event ending time in the event information and the like (Step S16). Then, the similar processing will be performed about an event, which is started next.

In this manner, in a case where a user of a client wishes to search for posted comments, the user may select a comment-search keyword from the search-keyword list 226. As a result, user-friendliness is increased when inputting a comment-search keyword.

Meanwhile, a user of the client 200 wishes to add a hashtag indicating a broadcast station to conditions for registering a keyword on the keyword server 500 and to conditions for obtaining a keyword from the keyword server 500. In this case, a check mark is set in the channel-hashtag check box 225 (FIG. 4) of the SNS page 220. In the case where a check mark is set in the channel-hashtag check box 225, the information detection section 205 of the client 200 may send a keyword-registering request or a keyword-obtaining request to the keyword server 500. The keyword-registering request or the keyword-obtaining request includes the hashtag in addition to the event ID. The ranking section 502 of the keyword server 500 receives the keyword-registering request including the event ID and the hashtag. In this case, the ranking section 502 manages keywords for each combination of an event ID and a hashtag. In addition, the ranking section 502 creates and update a keyword ranking.

As described above, according to this embodiment, keywords and keyword ranking, which are related to an event in which a user of the client 200 joins, may be provided to the user. The keyword server 500 automatically supplies keywords and a keyword ranking to the client 200 without the need of a request operation by a user. Because of this, the user may refer to the keywords and the keyword ranking without waiting. The user may input a keyword for searching for posted comments right away.

Further, a keyword ranking is information, in which the registration-request number for each keyword in a past predetermined period are updated in descending order. Even if the number of keywords in the search-keyword list 226 is extremely large, and even if it is difficult for a user to find a desired keyword, a user may find a keyword from a keyword ranking efficiently.

Figure 7:
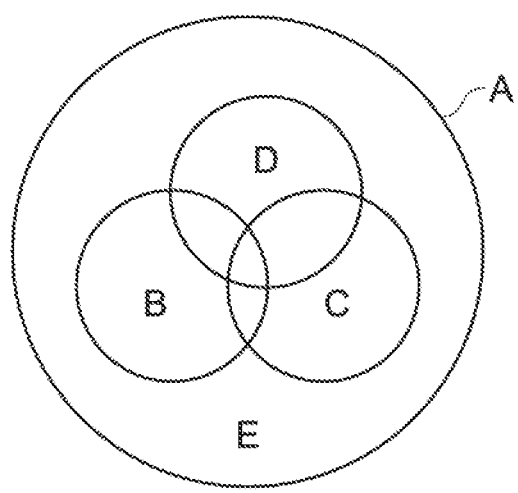
FIG. 7 is a diagram conceptually showing a comment space of the first embodiment.

FIG. 7 is a diagram conceptually showing a comment space of the above-mentioned first embodiment.

According to the first embodiment, the set B of comments identified by a hashtag, the set C of comments identified by keywords in a keyword list and a keyword ranking, and the set D of comments identified by an event ID may be retrieved from the entire comments A. However, the entire comments A still include the rest portion E, which are not included in the set B, the set C, or the set D. In view of this, according to the first embodiment, in order to reduce the number of comments in the rest portion E of FIG. 7, the following method is employed, as described in Step S5 to Step S8.

Figure 8:
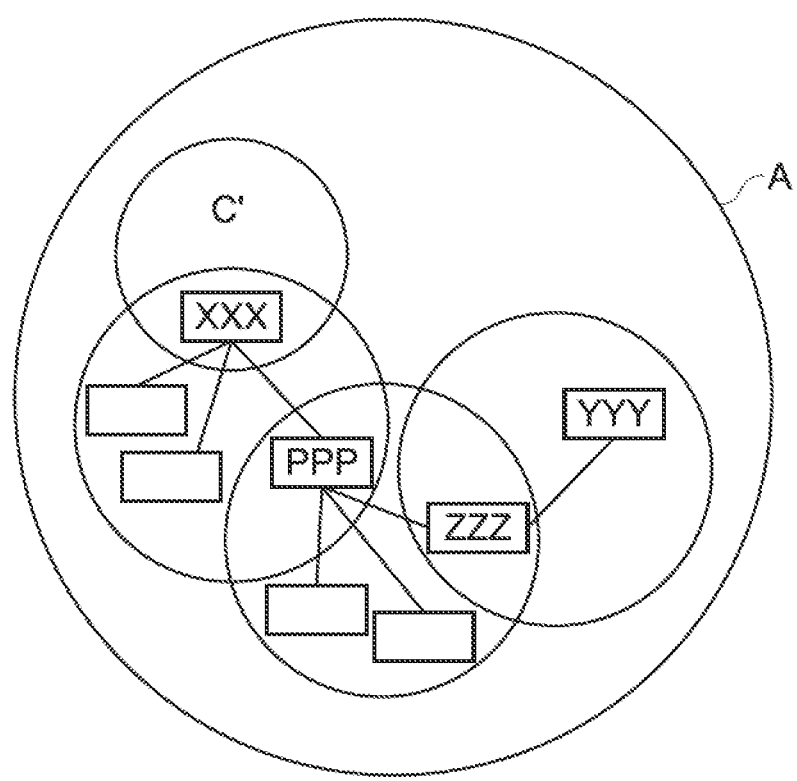
FIG. 8 is another diagram conceptually showing the comment space of the first embodiment.

FIG. 8 is another diagram conceptually showing a comment space of the first embodiment.

Here, a circle indicates a set of comments, which relate to a particular keyword. A box indicates a word. A line connecting boxes indicates link information between words. The link information is created from comments. Words connected by link information are created from comments including words, which express that something is equivalent to something (for example, comments such as "XXX looks like PPP." and "XXX is PPP."). That is, link information, which indicates that "XXX" is equivalent to "PPP", is created. In the example of FIG. 8, the set C' includes a word "XXX". In this case, comments, each of which includes "PPP" but does not include "XXX", may be considered as comments in the set C' based on the link information, which indicates that "XXX" is equivalent to "PPP". Similarly, link information, in which "PPP" is equivalent to "ZZZ", is established. In this case, comments, each of which includes "ZZZ" but does not include "XXX" and "PPP", may be considered as comments in the set C'. In this manner, a plurality of comments each including semantically equivalent words are considered as one set and searched, irrespective of original words in each comment. As a result, the number of comments in the set E of FIG. 7 may be reduced. A CPU of the keyword server 500 creates the link information based on a program.

[Typical Computer]

Each of the client 200, the EPG delivery server 300, the SNS server 400, and the keyword server 500 is implemented by the following typical computer.

Figure 9:
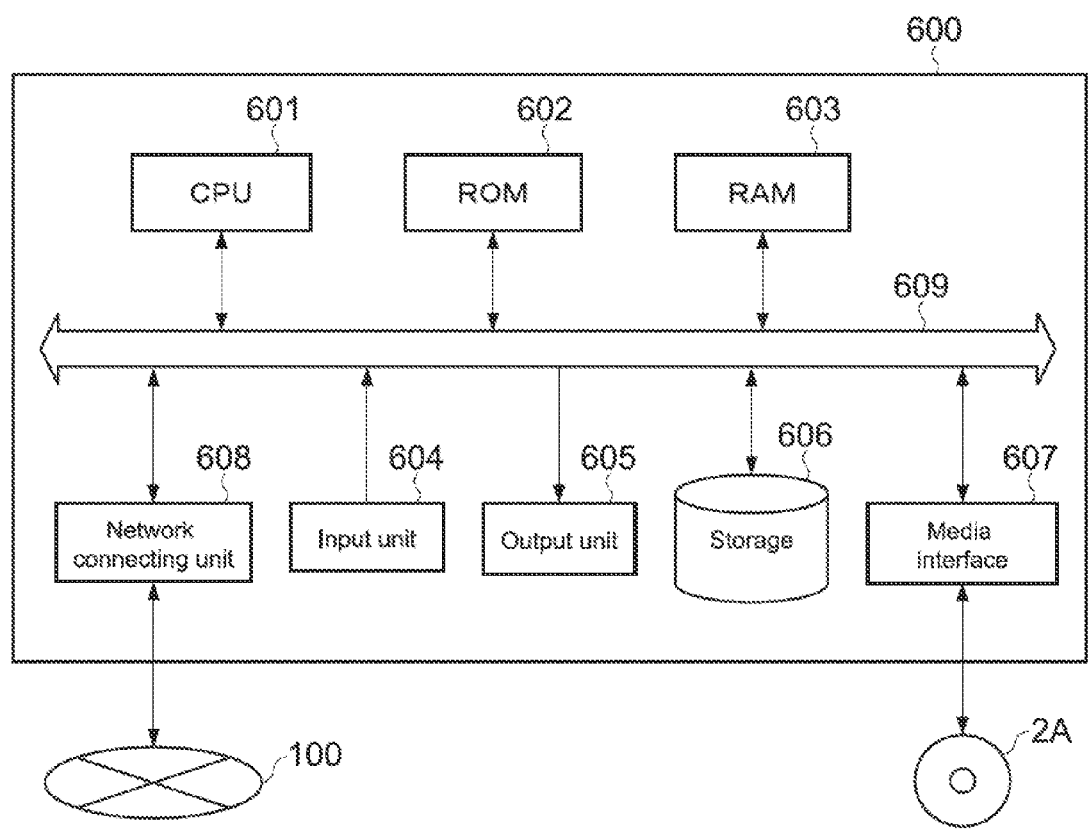
FIG. 9 is a diagram showing a hardware configuration of a typical computer.

FIG. 9 is a diagram showing a hardware configuration of a typical computer 600.

As shown in FIG. 9, the computer 600 includes a CPU (Central Processing Unit) 601, a ROM (Read Only Memory) 602, and a RAM 603. Further, the computer 600 includes an input unit 604, an output unit 605, storage 606, a media interface 607, a network connecting unit 608, and a bus 609 connecting them.

The CPU 601 functions as an arithmetic processing unit and a controller unit. The CPU 601 controls the overall behaviors of the computer 600 based on various programs. The ROM 602 stores programs, arithmetic parameters, and the like that the CPU 601 uses. The RAM 603 temporally stores programs executed by the CPU 601, parameters that change arbitrarily when the CPU 601 executes the programs, and the like.

The input unit 604 includes an input unit, an input control circuit, and the like. The input unit includes, for example, a mouse, a keyboard, a touchscreen, buttons, a microphone, a switch, a lever, and the like. A user input information in the input unit. The input control circuit creates input signals based on inputs from a user, and outputs the signals to the CPU 601. A user of the computer 600 operates the input unit 604. As a result, the user may input various data in the CPU 601, and input processing/operation instructions in the CPU 601.

The output unit 605 includes a display unit. The display unit is, for example, a CRT (Cathode Ray Tube) display unit, an LCD (Liquid Crystal Display) unit, an OLED (Organic Light Emitting Diode) unit, or the like. Further, the output unit 605 includes a sound output unit such as a speaker or a headphone.

The storage 606 stores programs and user data. The storage 606 includes a storage medium, a reader/writer, and the like. The reader/writer reads/writes data from/in the storage medium. The storage 606 is, for example, an HDD (Hard Disk Drive), an SSD (Solid State Drive), or the like.

The media interface 607 is a reader/writer for a storage medium. The media interface 607 reads/writes data from/in a removal storage medium 2A, which is mounted on the information terminal 200. Examples of the removal storage medium 2A include a magnetic disk, an optical disk, a magnet-optical disk, a semiconductor memory, and the like.

The network connecting unit 608 is an interface for connecting to the network 100, for example. The network connecting unit 608 may be a wireless LAN (Local Area Network)-compliant device, a wireless USB-compliant device, or a wire communication device for performing wire communication.

Note that a specific product type of the client 200, which is implemented by the typical computer 600 is, for example, a PC (Personal Computer) or the like. However, the client 200 of the present technology is not limited to a PC or the like. The client 200 may be of any specific product type as long as the client 200 at least includes hardware elements shown in FIG. 9. Examples of the client 200 include a smartphone, a mobile phone, a PDA (Personal Digital Assistant), a television receiver, and the like.

Second Embodiment

Difference Between First Embodiment and Second Embodiment

In a second embodiment, the client 200 receives a comment-search keyword, which a user manually inputs in the search window 221 on the SNS page 220 (see FIG. 4). When the client 200 receives the input comment-search keyword, the client 200 request the SNS server 400 to search for comments. In this case, the client 200 extracts a keyword from a text input in the search window 221. The client 200 registers the extracted keyword on the keyword server 500.

Figure 10:
FIG. 10 is a diagram showing how to add a keyword, which is created based on a search keyword, to a keyword list.

How the client 200 works will be briefly described with reference to FIG. 10. A user manually inputs "XXX" in the search window 221 of the SNS page 220. The client 200 sends a comment-search request to the SNS server 400. The comment-search request includes a comment-search keyword 246 "XXX". Further, the client 200 sends a keyword-registering request to the keyword server 500. The keyword-registering request includes the comment-search keyword 246 "XXX". The client 200 adds the comment-search keyword 247 "XXX" to the search-keyword list 226.

In the second embodiment, the keyword server 500 obtains statistics of keywords, which are used to search for comments posted on the SNS server 400, for each event-identification information. The keyword server 500 creates a keyword ranking. The keyword ranking is a list of keywords, which are most used in a past predetermined period. The client 200 is configured to provide a keyword ranking, which is created by the keyword server 500, to a user, in addition to the keywords, which are narrowed based on event-identification information. The keyword ranking is created based on keywords, which are used for searching in a past predetermined period. A short period (about several minutes to several tens of minutes) is set as the period. As a result, the keyword ranking includes keywords, which relate to a matter in which many users are interested in recent several minutes to several tens of minutes.

Further, in the first embodiment, the keyword server 500 requests the EPG delivery server 300 to register keywords and a keyword ranking (Step S10). The EPG delivery server 300 sends keywords and a keyword ranking to the client 200 (Step S12). To the contrary, in the second embodiment, the keyword server 500 requests a keyword delivery server 900 to register keywords and a keyword ranking. The keyword delivery server 900 sends keywords and a keyword ranking to the client 200.

Hereinafter, configurations and functions similar to those of the first embodiment will be denoted by similar reference symbols, description thereof will be omitted, and different points will be described.

[Configuration of Network System]

Figure 11:
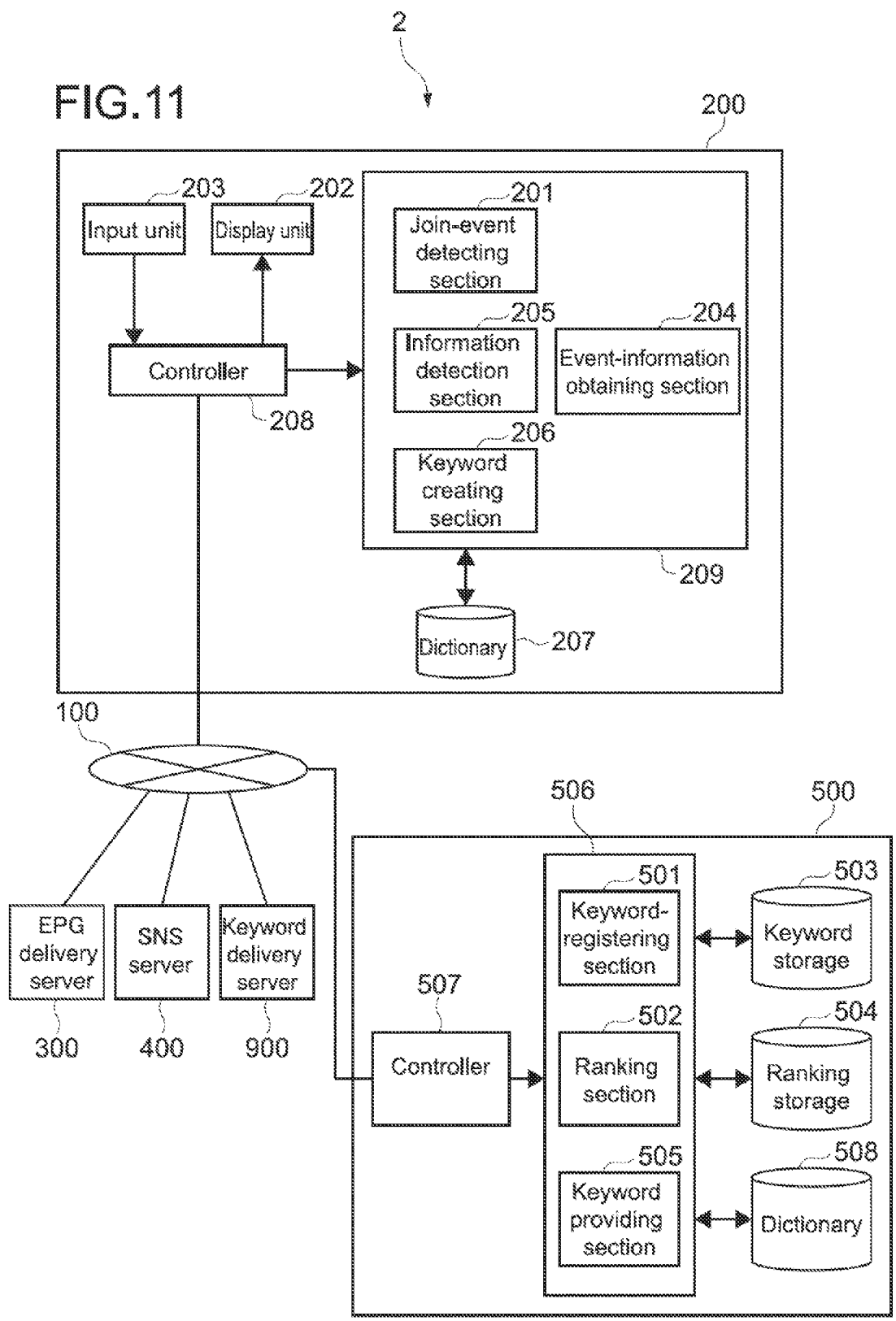
FIG. 11 is a diagram showing a configuration of a network system of a second embodiment.

FIG. 11 is a diagram showing the configuration of a network system according to the second embodiment of the present technology.

As shown in FIG. 11, a network system 2 has a configuration in which the keyword delivery server 900 is configured to connect to the network 100 of the network system 1 of the first embodiment.

The keyword delivery server 900 receives a keyword ranking and a keyword list from the keyword server 500. The keyword delivery server 900 stores the keyword ranking and the keyword list. The keyword delivery server 900 sends the stored keyword ranking and keyword list in reply to the request from the client 200.

That is, in the first embodiment, the EPG delivery server 300 stores a keyword ranking and keywords, and sends the keyword ranking and the keywords to the client 200 in reply. To the contrary, in the second embodiment, the dedicated keyword delivery server 900 delivers a keyword ranking and a keyword list in order to reduce the load on the EPG delivery server 300.

[Functional Configuration of Client 200]

The client 200 includes a join-event detecting section 201, an event-information obtaining section 204, an information detection section 205, a keyword creating section 206, and a dictionary 207. Programs in storage are loaded in memory. A controller 208 interprets and executes the programs to thereby implement the functional sections 204 to 206 in a functional group 209. The dictionary 207 is set in rewritable nonvolatile storage. The client 200 further includes a display unit 202 and an input unit 203.

The join-event detecting section 201 accesses an SNS page. After that, the join-event detecting section 201 determines the event ID (program ID) of a program, which a user is now watching. The join-event detecting section 201 sends a keyword-list obtaining request to the keyword delivery server 900. The keyword-list obtaining request includes the event ID.

The information detection section 205 obtains keywords and a keyword ranking from the keyword delivery server 900. Then, the information detection section 205 displays the keywords in the search-keyword list 226 (FIG. 4) in the SNS page 220. Then, the information detection section 205 displays the keyword ranking in the ranking display area 228 (FIG. 4) in the SNS page 220.

Further, the information detection section 205 detects that a comment-search keyword is input. The information detection section 205 sends a comment-search request to the SNS server 400. The comment-search request includes a comment-search keyword, which is input in the search window 221. The information detection section 205 updates the SNS page displayed on the display unit 202 based on the comment-search reply, which is received from the SNS server 400.

The keyword creating section 206 extracts a keyword to be registered. For example, the keyword to be registered is a comment-search keyword, i.e., a single word input in the search window 221. Alternatively, the keyword to be registered is a proper noun, which is obtained from a comment-search keyword (short sentence) by means of morphological analysis. The keyword creating section 206 sends a keyword-registering request (second keyword-registering request) to the keyword server 500. The keyword-registering request includes the extracted keyword to be registered, and an event ID.

[Behaviors]

Next, how the client 200, the EPG delivery server 300, the SNS server 400, the keyword server 500, and the keyword delivery server 900 work will be described.

Figure 12:
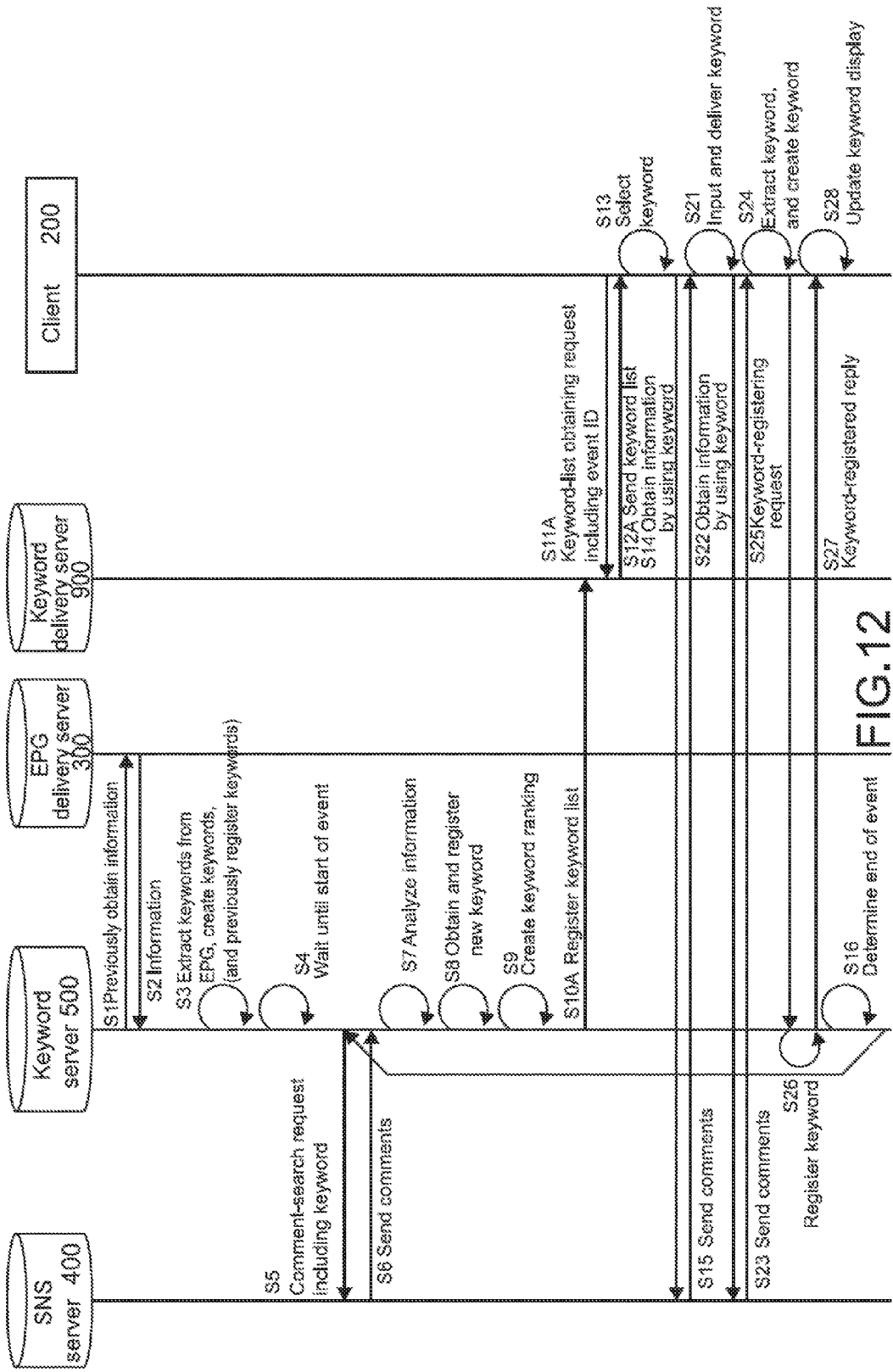
FIG. 12 is a sequence diagram showing how the network system of the second embodiment works.

FIG. 12 is a sequence diagram showing how the network system of the second embodiment works.

The keyword providing section 505 of the keyword server 500 reads keywords from the keyword storage 503, and reads a keyword ranking from the ranking storage 504. The keyword providing section 505 sends the keywords and the keyword ranking to the keyword delivery server 900 (keyword delivery server). The keyword providing section 505 requests the keyword delivery server 900 to register the keywords in relation to an event ID, and to register the keyword ranking in relation to the event ID (Step S10A).

The join-event detecting section 201 of the client 200 accesses an SNS page. After that, the join-event detecting section 201 determines the event ID (program ID) of a program, which a user is now watching. The join-event detecting section 201 sends a keyword-list obtaining request to the keyword delivery server 900 (Step S11A). The keyword-list obtaining request includes the event ID. The keyword delivery server 900 receives the keyword-list obtaining request from the client 200. Then, the keyword delivery server 900 extracts the event ID from the keyword-list obtaining request. The keyword delivery server 900 reads the keywords and the keyword ranking, which are registered in relation to the extracted event ID. The keyword delivery server 900 sends the keywords and the keyword ranking to the client 200 (Step S12A). The information detection section 205 of the client 200 obtains the keywords and the keyword ranking from the keyword delivery server 900. Then, the information detection section 205 displays the keywords in the search-keyword list 226 (FIG. 4) on the SNS page 220, and displays the keyword ranking in the ranking display area 228 (FIG. 4) on the SNS page 220.

A user inputs a text as a comment-search keyword in the search window 221 (FIG. 4) on the SNS page 220, which is displayed on the display unit 202 of the client 200, by means of the input unit 203. The user clicks the search button 222. The information detection section 205 detects that the comment-search keyword is input (Step S21). The information detection section 205 sends a comment-search request to the SNS server 400 (Step S22). The comment-search request includes a comment-search keyword, which is input in the search window 221. Note that the input comment-search keyword is not limited to a word. Instead, a short sentence including a plurality of words may be input.

The SNS server 400 receives the comment-search request from the client 200. Then, the SNS server 400 extracts a comment-search keyword from the comment-search request. The SNS server 400 searches for posted comments, each of which includes the comment-search keyword, and information on the comments. The information on the comments include, for example, posting date/time, poster names, and the like. Then, the SNS server 400 sends a comment-search reply to the client 200 (Step S23). The comment-search reply includes the comment-search result. The information detection section 205 of the client 200 updates the SNS page, which is displayed on the display unit 202, based on the comment-search reply, which is received from the SNS server 400.

Meanwhile, the keyword creating section 206 (first keyword-registering request section) of the client 200 extracts a keyword to be registered (Step S24). For example, the keyword to be registered is a comment-search keyword, i.e., a single word input in the search window 221. Alternatively, the keyword to be registered is a proper noun, which is obtained from a comment-search keyword (short sentence) by means of morphological analysis. The keyword creating section 206 sends a keyword-registering request (first keyword-registering request) to the keyword server 500. The keyword-registering request includes the extracted keyword to be registered, and an event ID (Step S25).

Figure 13:
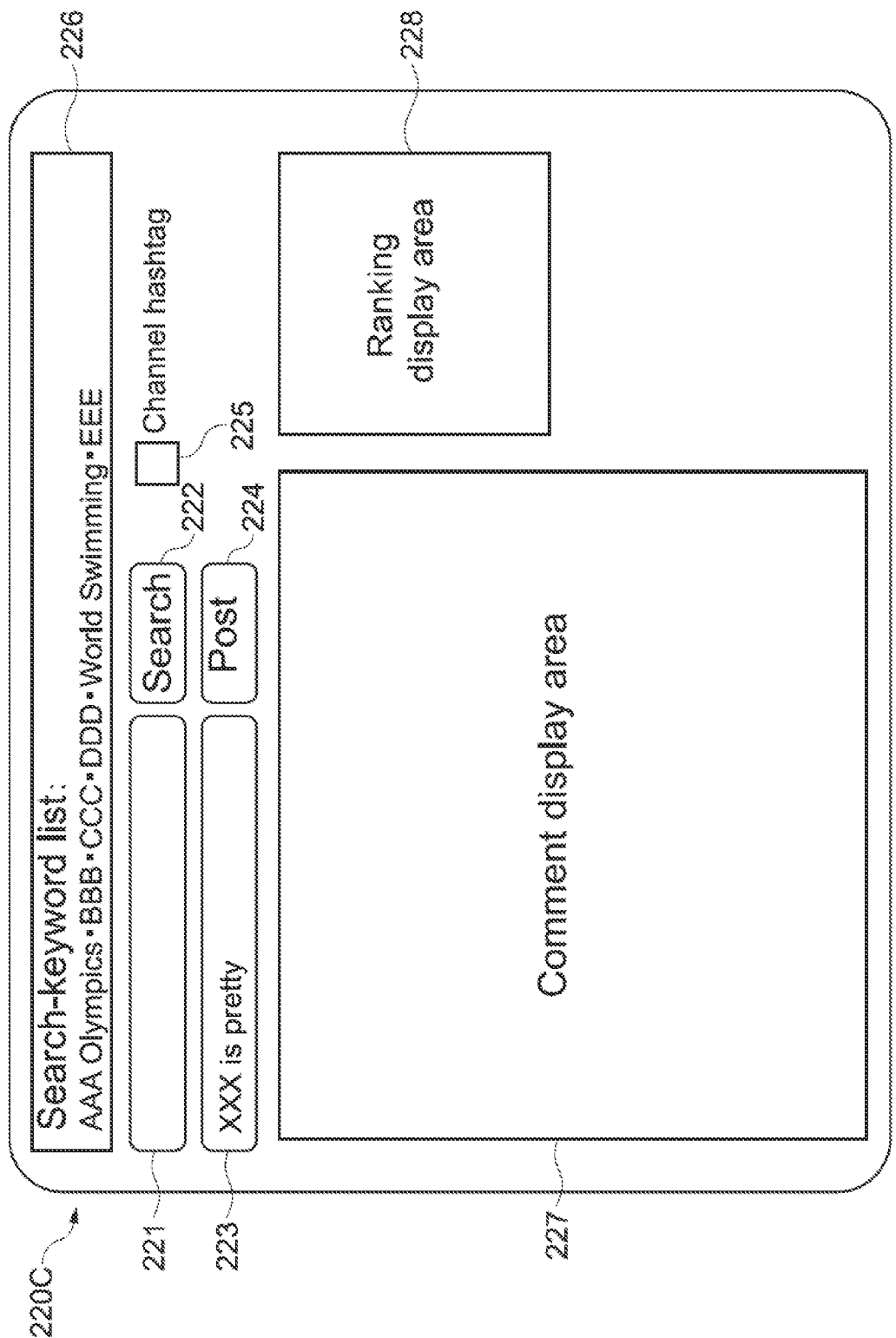
FIG. 13 is another diagram showing an example of the SNS page.

The keyword-registering section 501 (third keyword-registering section) of the keyword server 500 receives the keyword-registering request from the client 200. Then, the keyword-registering section 501 registers the keyword and the event ID, which are included in the keyword-registering request, and the registering time on the keyword storage 503 (Step S26). After that, the keyword-registering section 501 extracts a keyword, which is registered in relation to the event ID, from the keyword storage 503. The keyword-registering section 501 sends a keyword-registered reply to the client 200 (Step S27). The keyword-registered reply includes the extracted keyword and the event ID. The information detection section 205 of the client 200 receives the keyword-registered reply from the keyword server 500. Then, the information detection section 205 creates an SNS page 220C by newly adding the extracted keyword "XXX", for example, to the search-keyword list 226 as shown in FIG. 13. The information detection section 205 requests the display unit 202 to display the SNS page 220C (Step S28).

Figure 14:
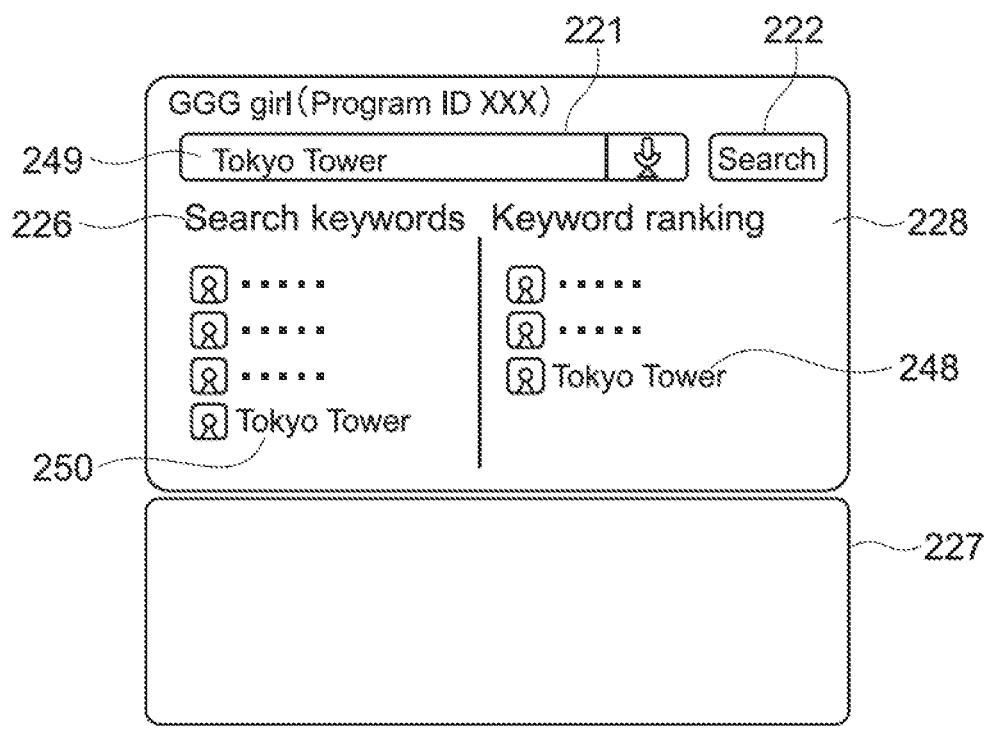
FIG. 14 is a diagram for explaining how to add a keyword, which is selected as a search keyword from a keyword ranking, to a keyword list.

Note that a user may select and click an arbitrary keyword in a keyword ranking displayed in the ranking display area 228. As a result, the user inputs the keyword in the search window 221 on the SNS page 220 as a comment-search keyword. For example, the client 200 detects that a user selects and clicks a keyword "Tokyo Tower" 248, which is included in a keyword ranking displayed in the ranking display area 228, as shown in FIG. 14. Then, the client 200 sets the keyword "Tokyo Tower" 249 in the search window 221 on the SNS page 220. Then, the keyword "Tokyo Tower" 250 selected by the user is displayed in the search-keyword list 226 as a keyword, which was used before.

Further, in the above-mentioned example (Step S21), a text is input in the search window 221 as a comment-search keyword. Alternatively, a text, i.e., a comment, may be input in the comment-input window 223. The keyword creating section 206 (second keyword-registering request section) may extract a keyword from the comment, which the user posts on the SNS server 400 (Step S24). The keyword creating section 206 may send a keyword-registering request (second keyword-registering request) to the keyword server 500. The keyword-registering request includes the extracted keyword and an event ID. The keyword-registering section 501 (fourth keyword-registering section) of the keyword server 500 receives the keyword-registering request from the client 200. Then, the keyword-registering section 501 registers the keyword and the event ID, which are included in the keyword-registering request, and the registering time on the keyword storage 503 (Step S26).

Third Embodiment

In the first embodiment, the keyword server 500 creates keywords based on event information, which is received from the EPG delivery server 300. In addition, the keyword server 500 creates keywords based on posted comments, which are received from the SNS server 400. To the contrary, in a third embodiment, another apparatus creates keywords based on event information, which is received from the EPG delivery server 300. Still another apparatus creates keywords based on posted comments, which is received from the SNS server 400.

[Configuration of Network System]

Figure 15:
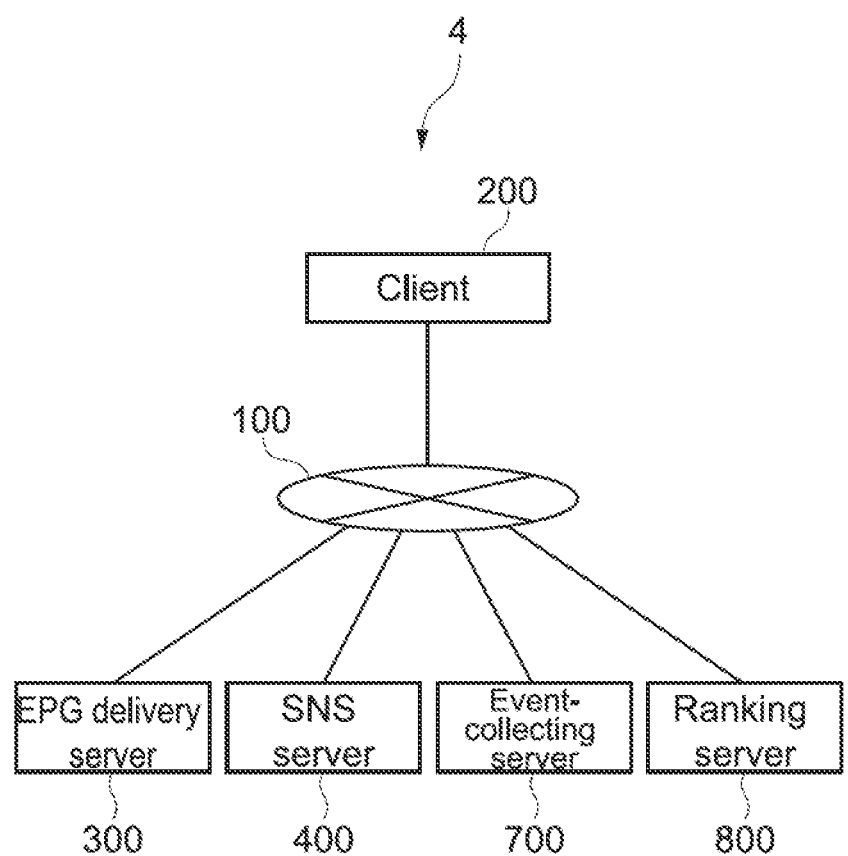
FIG. 15 is a diagram showing the configuration of a network system of a third embodiment.

FIG. 15 is a diagram showing the configuration of a network system according to the third embodiment.

As shown in FIG. 15, a network system 4 includes the network 100, the client 200, the EPG delivery server 300, the SNS server 400, an event-collecting server 700, and a ranking server 800. The client 200, the EPG delivery server 300, the SNS server 400, the event-collecting server 700, and the ranking server 800 are configured to connect to the network 100.

The event-collecting server 700 receives event information from the EPG delivery server 300. The event-collecting server 700 creates keywords based on the event information, and supplies the keywords to the ranking server 800.

The ranking server 800 receives posted comments from the SNS server 400. The ranking server 800 creates keywords based on the posted comments. The ranking server 800 creates a keyword ranking based on the created keywords and based on keywords obtained from the event-collecting server 700.

[Behaviors]

Figure 16:
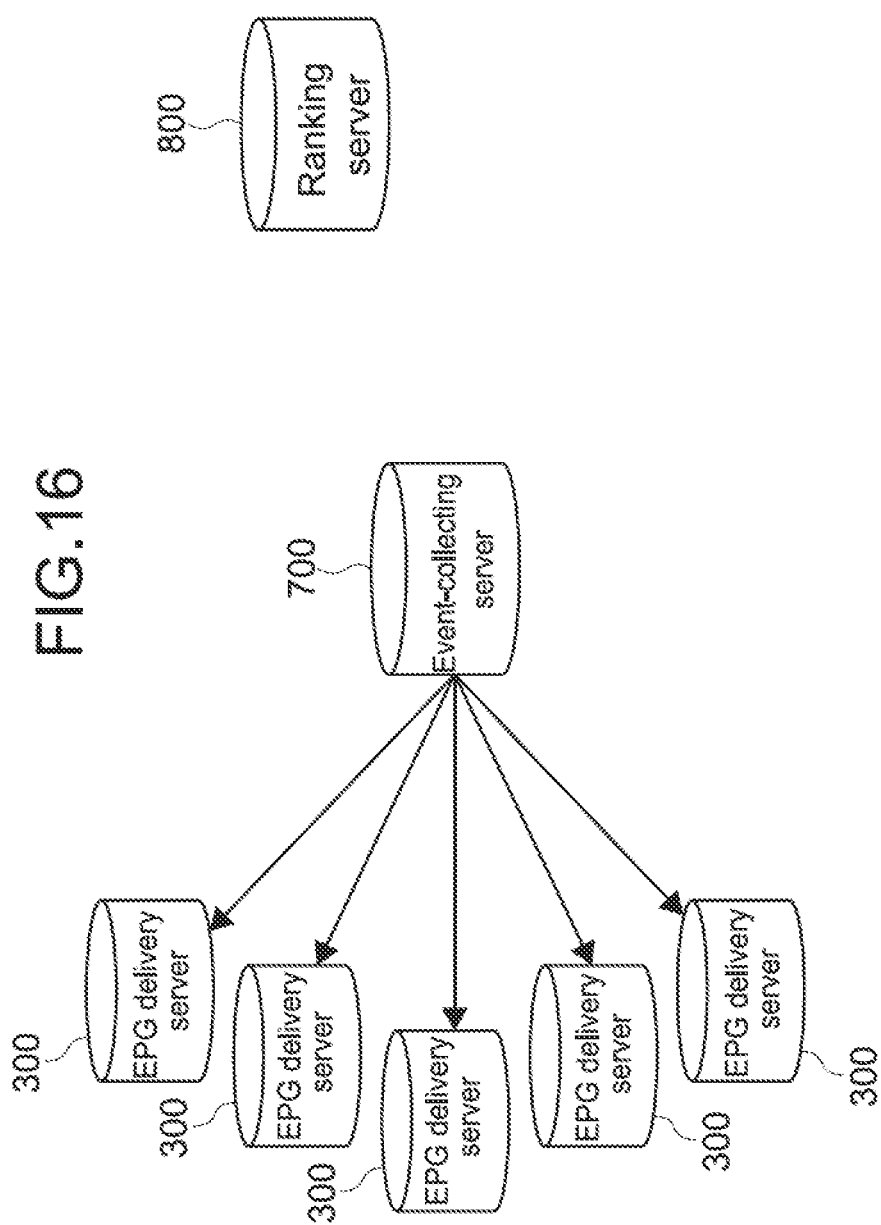
FIG. 16 is a diagram conceptually showing how an EPG delivery server, an SNS server, an event-collecting server, and a ranking server of the third embodiment work.
Figure 18:
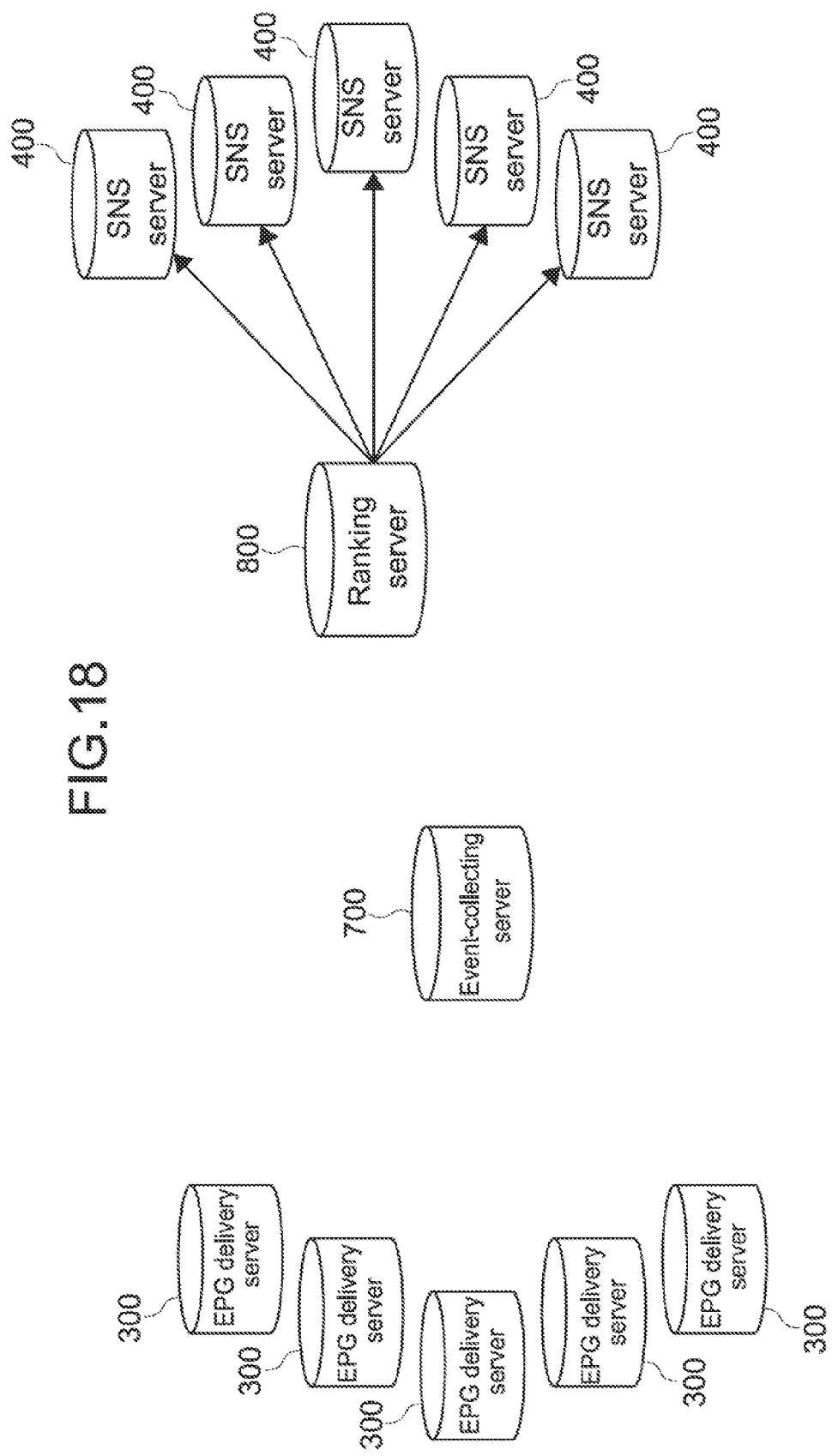
FIG. 18 is another diagram conceptually showing how the EPG delivery server, the SNS server, the event-collecting server, and the ranking server of the third embodiment work.

FIG. 16, FIG. 17, and FIG. 18 are diagrams conceptually showing how the EPG delivery server 300, the SNS server 400, the event-collecting server 700, and the ranking server 800 work.

As shown in FIG. 16, the event-collecting server 700 obtains an event-information reply from each EPG delivery server 300 (corresponding to Steps S1 and S2 of first embodiment). The event-information reply includes information such as an event ID (program ID), a program title, detailed information on a program, start time, ending time, and the like. The event-collecting server 700 extracts one or more keywords from the detailed information, which is included in the event-information reply received from the EPG delivery server 300. The event-collecting server 700 time-orientedly (timeline) records the one or more created keywords, the event ID, the start time, the ending time, and the like in relation to each other (corresponding to Step S3 of first embodiment).

As shown in FIG. 17, the ranking server 800 obtains information (one or more keywords, event ID, start time, ending time, and the like) from the event-collecting server 700 every predetermined period. The ranking server 800 stores the obtained information time-orientedly (timeline). Here, the event-collecting server 700 provides information on an event, which is not started, to the ranking server 800.

As shown in FIG. 18, the ranking server 800 determines that an event starts. Then, the ranking server 800 crawls each SNS server 400. The ranking server 800 obtains posted comments each including a keyword. The keyword is registered in relation to the event ID of the event, the start of which was determined. The ranking server 800 extracts the keyword. The ranking server 800 creates a keyword ranking for each event ID based on the keywords obtained from the event-collecting server 700, and based on the keywords obtained from the SNS server 400. The ranking server 800 records the keyword ranking (corresponding to Step S4 to S9 of first embodiment).

According to this embodiment, the event-collecting server 700 creates keywords based on event information, which is received from the EPG delivery server 300. The ranking server 800 creates keywords based on posted comments, which are received from the SNS server 400. As a result, load on the servers 700 and 800 may be reduced.

Modified Example 1

According to the first embodiment, the keyword server 500 obtains event information from the EPG delivery server 300. The keyword server 500 obtains posted comments from the SNS server 400. The keyword server 500 creates keywords by means of morphological analysis. To the contrary, according to a modified example 1, the client 200 creates keyword by means of morphological analysis based on event information, which is obtained from the EPG delivery server 300, and based on comments posted on the SNS server 400.

[Configuration of Network System]

Figure 19:
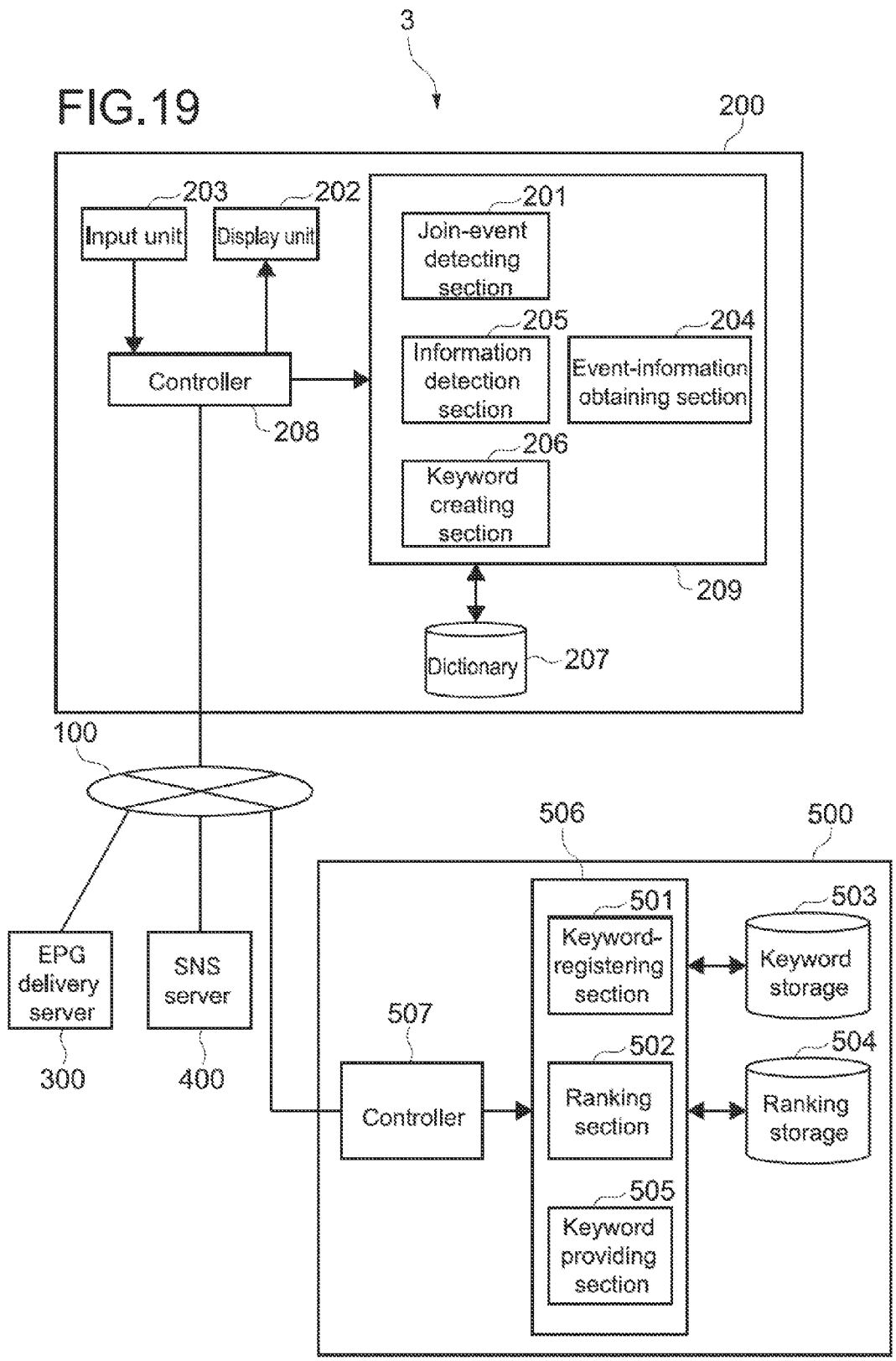
FIG. 19 is a diagram showing the configuration of a network system of a modified example 1.

FIG. 19 is a diagram showing the configuration of a network system according to the modified example 1.

As shown in FIG. 19, a network system 3 has the configuration same as the configuration of the network system 2 of the second embodiment except that the network system 3 does not include the keyword delivery server 900.

[Behaviors]

Figure 20:
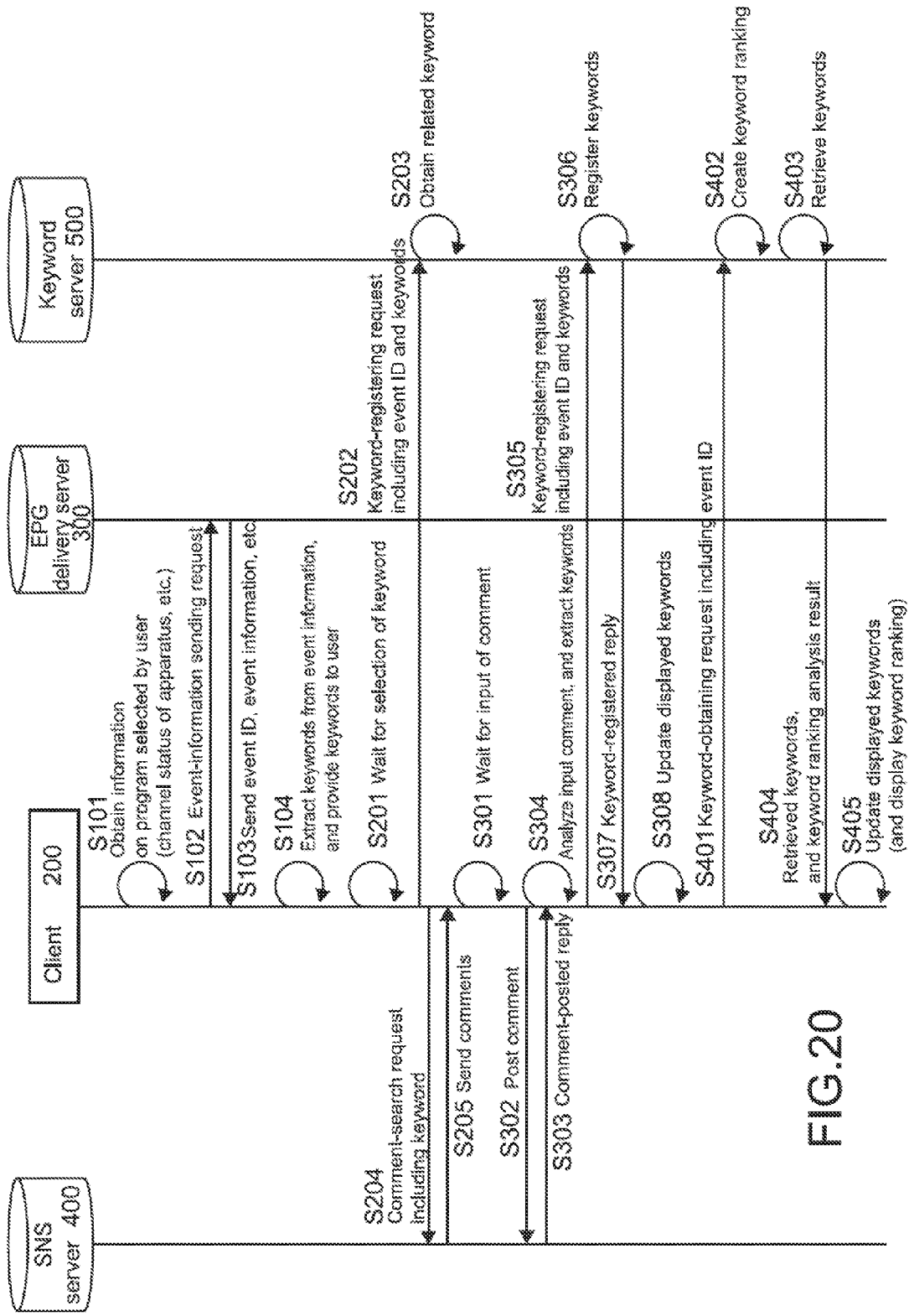
FIG. 20 is a sequence diagram showing how the network system of the modified example 1 works.

FIG. 20 is a sequence diagram showing how the client 200, the EPG delivery server 300, the SNS server 400, and the keyword server 500 work.

How the client 200, the EPG delivery server 300, the SNS server 400, and the keyword server 500 work will be described in the following order.

1. Extracting keywords from event information (Step S100s)
2. Searching for comments (Step S200s)
3. Posting comment, and extracting keyword from comment (Step S300s)
4. Obtaining keywords from keyword server (Step S400s)

Note that, in FIG. 20, one sequence diagram includes the stages 1 to 4 in this order. However, the stages 1 to 4 are not always executed in this order actually. Each of the stages 2 to 4 may be executed after the stage 1.

[1. Extracting Keywords from Event Information]

The join-event detecting section 201 of the client 200 accesses an SNS page. After that, the join-event detecting section 201 obtains program-selection information for selecting a program, which a user is now watching (for example, current channel information, etc.). The join-event detecting section 201 informs the event-information obtaining section 204 of the program-selection information (Step S101).

The event-information obtaining section 204 obtains the channel information from the join-event detecting section 201. The event-information obtaining section 204 sends an event-information sending request to the EPG delivery server 300 (Step S102). The event-information sending request includes the channel information.

The EPG delivery server 300 receives the event-information sending request from the client 200. Then, the EPG delivery server 300 extracts channel information from the event-information sending request. The EPG delivery server 300 determines an appropriate program based on the channel information and the current time. Subsequently, the EPG delivery server 300 extracts information on the determined program from EPG data, which is stored in the EPG delivery server 300. The information includes an event ID, event information (detailed information on program), a program title, broadcasting hours, and the like. The EPG delivery server 300 sends an event-information reply to the client 200 in reply (Step S103). The event-information reply includes the extracted information.

The event-information obtaining section 204 of the client 200 obtains the event-information reply from the EPG delivery server 300. Then, the event-information obtaining section 204 records pieces of information, which are included in the event-information reply, in event information storage (not shown) in relation to each other. In addition, the event-information obtaining section 204 informs the keyword creating section 206 of the event ID. The keyword creating section 206 obtains record information, which includes the event information, based on the event ID, of which the event-information obtaining section 204 informed the keyword creating section 206. The keyword creating section 206 extracts keywords from the event information.

Figure 21:
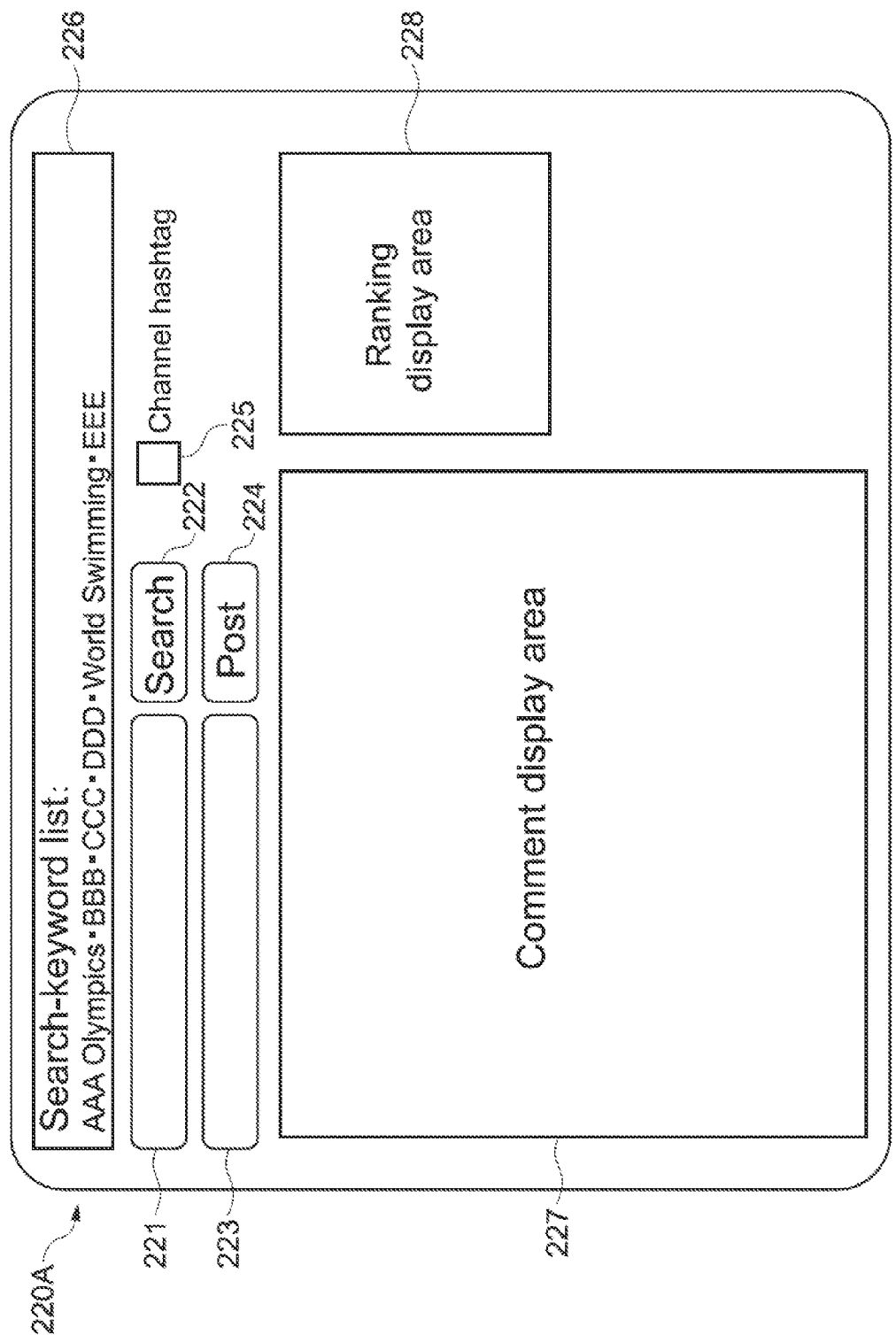
FIG. 21 is another diagram showing an example of the SNS page.

The keyword creating section 206 extracts keywords by means of morphological analysis. Specifically, the keyword creating section 206 extracts words from the event information. The keyword creating section 206 compares the extracted words with the dictionary 207 to thereby determine a word class of each word. Then, the keyword creating section 206 determines words, which are determined as proper nouns, for example, as keywords. The keyword creating section 206 records the extracted keywords and the event ID in relation to each other. In addition, for example, as shown in FIG. 21, the keyword creating section 206 creates the search-keyword list 226, which is a list of the extracted keywords. The keyword creating section 206 adds the search-keyword list 226 to an SNS page 220A, which is displayed (Step S104).

In this manner, SNS comment-search keywords are extracted from event information, which is detailed information on a program being reproduced. As a result, it is possible to provide such a keyword list to a user. The keyword list includes one or more keywords. A user, who is watching a program, may use the one or more keywords for search.

Note that, in Step S101, program-selection information is obtained when the client 200 is reproducing a program. Meanwhile, when an apparatus different from the client 200 is reproducing a program, program-selection information may be obtained as follows.

The join-event detecting section 201 outputs the following window on the display unit 202. The window urges a user to input a channel of a program, which the user is now watching, for example. The user inputs a channel by means of the input unit 203. The join-event detecting section 201 obtains the channel as the program-selection information.

[2. Searching for Comments]

A user wishes to search for posted comments each including a particular keyword. In this case, for example, the user clicks one keyword out of a plurality of keywords, which are displayed in the search-keyword list 226 in Step S106, by means of the input unit 203. In this manner, the user selects a keyword (Step S201).

The information detection section 205 determines the keyword selected by the user. The information detection section 205 sends a keyword-registering request to the keyword server 500 (Step S202). The keyword-registering request includes the selected keyword and the event ID. Note that the information detection section 205 may display the keyword, which is selected by the user, on the display unit 202 in a manner that the user is capable of distinguishing the selected keyword from unselected keywords.

The keyword-registering section 501 of the keyword server 500 receives the keyword-registering request from the client 200. Then, the keyword-registering section 501 registers the keyword and the event ID, which are included in the keyword-registering request, and the registering time in the keyword storage 503 (Step S203).

Meanwhile, the information detection section 205 of the client 200 sends a comment-search request to the SNS server 400 (Step S204). The comment-search request includes the keyword selected in Step S201.

The SNS server 400 receives the comment-search request from the client 200. Then, the SNS server 400 extracts a comment-search keyword from the comment-search request. The SNS server 400 searches for posted comments including the comment-search keyword, and searches for information such as posting date/time of the comments and poster names, for example. Then, the SNS server 400 sends a comment-search reply to the client 200 (Step S205). The comment-search reply includes the comment-search result.

The information detection section 205 of the client 200 updates an SNS page when the SNS page is displayed on the display unit 202, based on the comment-search reply, which is received from the SNS server 400.

[3. Posting Comment, and Extracting Keyword from Comment]

Figure 22:
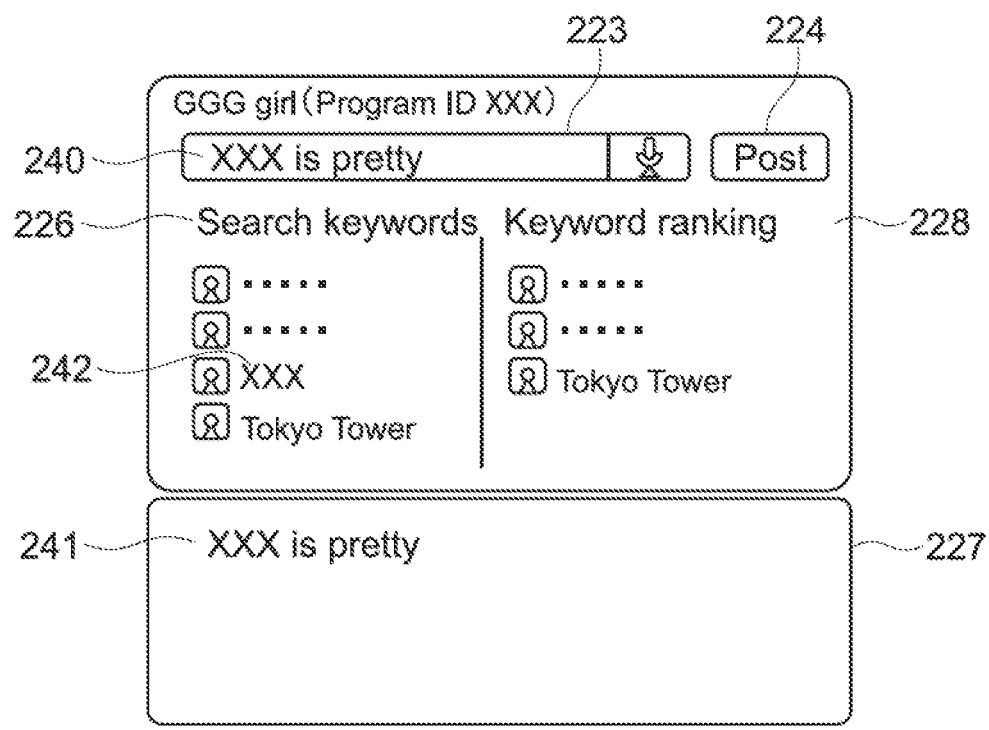
FIG. 22 is a diagram for explaining how to post a comment and how to extract a keyword from the comment.

FIG. 22 is a diagram for explaining behaviors in "3. posting comment, and extracting keyword from comment".

A user inputs a comment "XXX is pretty" 240 in the comment-input window 223 on the SNS page 220. The client 200 posts the comment "XXX is pretty" 240 on the SNS server 400. As a result, the comment "XXX is pretty" 241 is displayed on the comment display area 227. The client 200 extracts a keyword "XXX" from the comment "XXX is pretty" by means of morphological analysis or the like. The client 200 sends a keyword-registering request, which includes the keyword and event-identification information, such that the keyword server 500 registers the keyword. In addition, the client 200 displays the keyword "XXX" 242 on the search-keyword list 226 on the SNS page 220.

Hereinafter, behaviors in "3. posting comment, and extracting keyword from comment" will be described in detail.

The SNS page 220 is displayed on the display unit 202 of the client 200. A user manually inputs a text, i.e., a comment, in the comment-input window 223 (FIG. 4) on the SNS page 220 by means of the input unit 203. The user clicks the post button 224 to thereby input the comment (Step S301).

The information detection section 205 of the client 200 creates a comment-posting request. The comment-posting request includes the input comment, posting date/time of the comment, a user name, and the like. The information detection section 205 sends the comment-posting request to the SNS server 400 (Step S302). The SNS server 400 receives the comment-posting request. Then, the SNS server 400 sends a comment-posted reply to the client 200 (Step S303). The client 200 receives the comment-posted reply. Then, the client 200 activates the keyword creating section 206. The keyword creating section 206 decomposes the posted comment into one or more words by means of morphological analysis. The keyword creating section 206 refers to the dictionary 207, and determines, for example, proper nouns in those words as keywords (Step S304).

The keyword creating section 206 sends a keyword-registering request (first keyword-registering request) to the keyword server 500 (Step S202). The keyword-registering request includes the determined keywords and the event ID. The keyword-registering request further includes a hashtag, in a case where a comment includes a hashtag indicating a broadcast station.

The keyword-registering section 501 of the keyword server 500 receives the keyword-registering request from the client 200. Then, the keyword-registering section 501 registers the keywords, the event ID, and the hashtag, which are included in the keyword-registering request, and the current time as registering time in the keyword storage 503 in relation to each other (Step S306). After that, the keyword-registering section 501 sends a keyword-registered reply to the client 200 (Step S307). The keyword creating section 206 of the client 200 receives the keyword-registered reply from the keyword server 500. Then, for example, as shown in FIG. 13, the keyword creating section 206 adds the extracted keyword "XXX" to the search-keyword list 226 to thereby create the SNS page 220C. The creating section 206 displays the SNS page 220C on the display unit 202 (Step S308).

Note that, in Step S301, a user manually inputs a comment in the comment-input window 223 (FIG. 4) on the SNS page 220. Alternatively, a user selects an arbitrary keyword from the search-keyword list 226 on the SNS page 220. As a result, the keyword is set in the comment-input window 223. The user may manually input a text to thereby add the text to the keyword. As a result, a comment is created.

[4. Obtaining Keywords from Keyword Server]

When the SNS page 220 is displayed on the display unit 202 of the client 200, the information detection section 205 of the client 200 sends a keyword-obtaining request to the keyword server 500 at regular intervals (Step S401). The keyword-obtaining request includes the event ID, which is recorded in event information storage. The regular interval is about every several minutes to several tens of minutes, for example.

Meanwhile, the ranking section 502 of the keyword server 500 creates a keyword ranking of the keywords, which are registered in the keyword storage 503 in Step S203 and Step S305, for each event ID. The ranking section 502 stores the keyword ranking in the ranking storage 504 (Step S402).

The keyword providing section 505 of the keyword server 500 receives the keyword-obtaining request from the client 200 in Step S401. Then, the keyword providing section 505 extracts the event ID from the keyword-obtaining request. The keyword providing section 505 reads one or more keywords and a keyword ranking, which correspond to the event ID, from the keyword storage 503 (Step S403). Then, the keyword providing section 505 sends the read keywords and keyword ranking to the client 200 as a keyword-obtaining reply (Step S404).

The information detection section 205 of the client 200 obtains the keyword-obtaining reply from the keyword server 500. Then, the information detection section 205 extracts the keywords and the keyword ranking from the keyword-obtaining reply. The information detection section 205 adds the extracted keywords to the search-keyword list 226 as shown in FIG. 5. In addition, the information detection section 205 displays the extracted keyword ranking in the ranking display area 228 (Step S405).

Note that the information detection section 205 may display the keyword ranking in a manner that a user may recognize dynamic changes of the ranking for each keyword by changing the letter size, the color, and the like.

Further, if a keyword is a person's name or the like, the information detection section 205 may display a thumbnail image of a photograph of his face.

Figure 23:
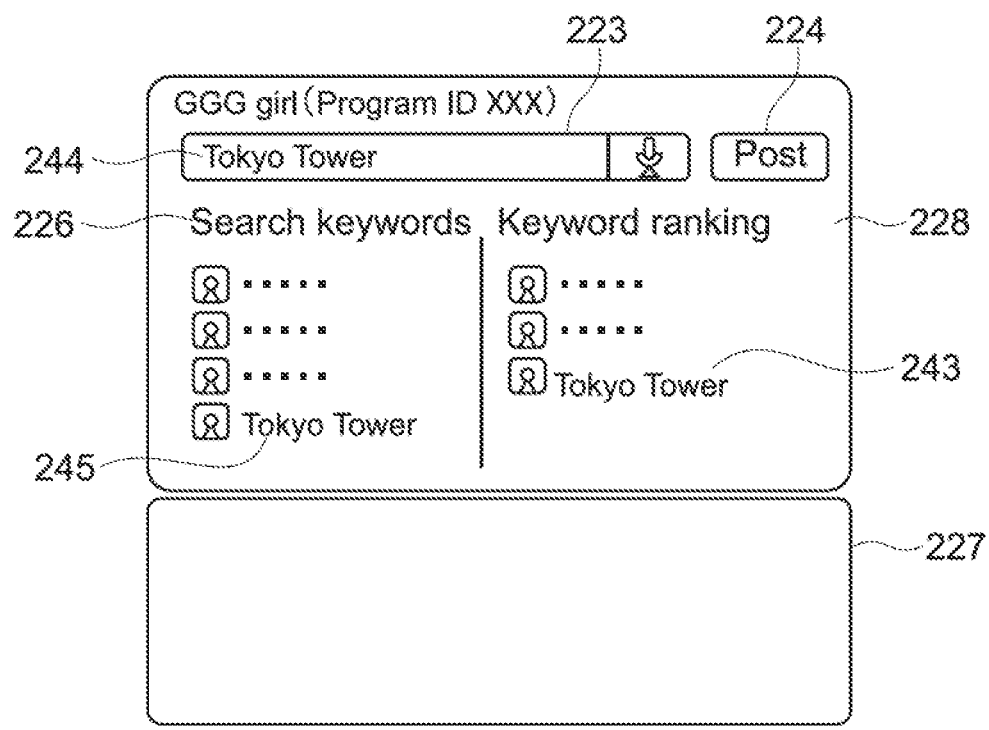
FIG. 23 is a diagram for explaining how to select a comment-search keyword from a keyword ranking.

Note that a user may select an arbitrary keyword from the keyword ranking displayed in the ranking display area 228 on the SNS page 220, and create a comment. For example, as shown in FIG. 23, a user selects a keyword "Tokyo Tower" 243 from a keyword ranking displayed in the ranking display area 228 the SNS page 220. In this case, the information detection section 205 sets the selected keyword "Tokyo Tower" 244 in the comment-input window 223 on the SNS page 220. The user may manually input a text to thereby add the text to the keyword set in the comment-input window 223. As a result, a comment is created. Further, the information detection section 205 sends a keyword-registering request to the keyword server 500. The keyword-registering request includes the keyword "Tokyo Tower", which the user selects from the ranking display area 228, and the event ID. The keyword server 500 increment the number of registering the keyword "Tokyo Tower", which is in relation to the event ID, in response to the keyword-registering request. Further, the information detection section 205 adds the keyword "Tokyo Tower" 245, which is selected from the ranking display area 228 by the user, to the search-keyword list 226 on the SNS page 220.

Modified Example 2

In the modified example 1, the client 200 extracts keywords from event information, which is obtained from the EPG delivery server 300, by means of morphological analysis (Step S104). Alternatively, the keyword creating section 206 of the client 200 may analyze sounds of a program reproduced by the client 200, convert the analyzed sounds into character data, and extract keywords from character data by means of morphological analysis.

Modified Example 3

In a modified example 3, one event program includes a plurality of corners, which are temporally separated. In this case, information on a time-slot of each corner is previously registered in the keyword server 500. A keyword list and a keyword ranking for each event ID are created for each corner. For example, in a case of a broadcast program, a corner of an event is a temporal range in a program. One corner is adjacent to another corner via a change point of casts, story, location, or the like, for example.

FIG. 24 is a diagram for explaining a specific example of the modified example 3.

In this example, one program includes three corners (A), (B), and (C), which are temporally separated. Start time/ending time of each of the three corners (A), (B), and (C) are registered in the keyword server 500. In addition, if an EPG includes detailed information on each corner, keywords, which are extracted from the detailed information on each corner, may be previously displayed in the search-keyword list 226 on an SNS page for each corner. The keyword server 500 registers keywords, which correspond to the event ID of the program, for each time-slot of a corner, based on the start time/ending time of each corner. In addition, the keyword server 500 creates a keyword ranking. As a result, the client 200 may obtain keywords, which relate to a matter to which many users pay attention, for each corner of one program. The keywords may be used right away as keywords for posting a comment on an SNS page and as keywords for searching for posted comments.

Modified Example 4

Figure 25:
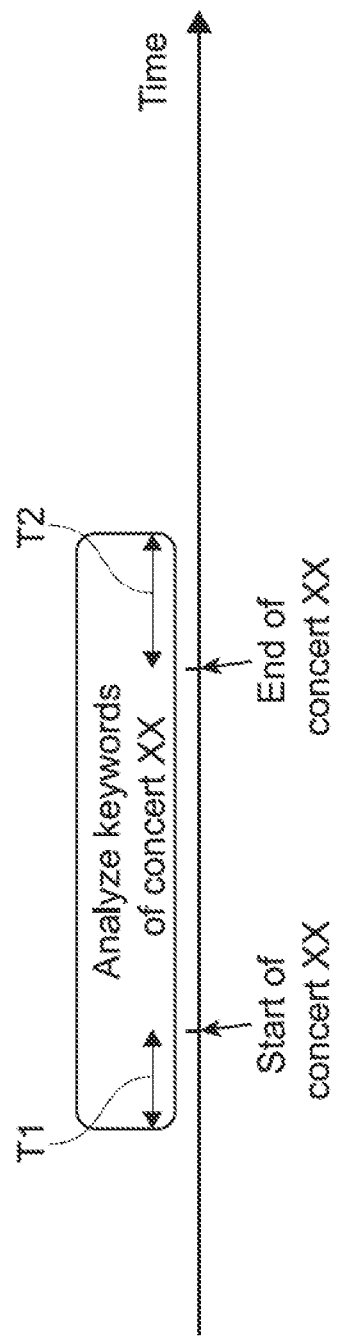
FIG. 25 is a diagram for explaining a specific example of a modified example 4.

The keyword server 500 does not always register keywords and create a keyword ranking during an event. For example, in a case where an event is a concert, most users only join in a concert during concert hours. A large number of comments about the concert may be posted immediately before the concert and immediately after the concert. In view of this, as shown in FIG. 25, the keyword server 500 may register keywords corresponding to an event ID of a program, and may create a keyword ranking in a time-slot T1 and in a time-slot T2. The time-slot T1 is a predetermined time period before the start time of the event. The time-slot T2 is a predetermined time period after the ending time of the event.

Modified Example 5

In recent years, information terminals such as television receivers have extremely large number of functions. For example, some television receivers are capable of connecting to the Internet and accessing various services in the Internet. In a case of using such a television receiver as the client 200, the input unit 203 is a remote control for controlling a television receiver, for example. The remote control has an input performance, which is extremely lower than the input performance of an input unit of a PC such as a keyboard or a mouse. In general, a remote control does not have a keyboard or the like. Because of this, in most cases, it is difficult for such a remote control to input a text in the search window 221 or the like displayed on the display unit 202. In view of this, according to a modified example 5, the client 200 detects an input operation in a predetermined button of a remote control as the input unit 203. Then, the client 200 searches for comments from the SNS server 400. The comments include a predetermined number (for example, top five) of top keywords in a keyword ranking displayed on the display unit 202, respectively. The client 200 displays the retrieved comments on the display unit 202. Alternatively, when an input operation in a predetermined button of a remote control is detected, an arbitrary keyword in a keyword ranking may be selected as a search target. In this case, comments including a predetermined number of top keywords are not searched for.

Other Modified Examples

Keywords are extracted from a comment or the like by means of morphological analysis and by using a dictionary. In this case, words, which are not proper nouns, may be extracted as keywords. Alternatively, a table, in which persons' nicknames and pet names are registered, may be stored in a keyword server. Persons' nicknames and pet names detected from comments may be preferentially registered as keywords.

Preference information for each user may be previously registered in a client. Keywords obtained from a keyword server may be displayed such that keywords, which a user may prefer, are highlighted by changing color, for example. As a result, the user may find the keywords easily.

In the above, description is made in a case where an event is a broadcast program or a concert. In summary, an event is a place to which many people pay attention at the same time, or a place in which many people join at the same time. In view of this, an event is not only a broadcast program or a concert, but also a particular place, a vehicle, an online game, or various thing. Note that each of such events should be individually identified by an identification information (ID).

There are various examples of how a keyword ranking is displayed. A keyword ranking may be displayed such that a user understand dynamic increase/decrease of the registration-request number for each keyword. For example, a keyword ranking may be displayed in a form of graph with a time axis.

Note that the present technology may employ the following configurations.

(1) A server apparatus, comprising:

keyword storage capable of storing event-identification information and one or more keywords in relation to each other, the event-identification information identifying an event, the one or more keywords relating to the event; and a first keyword-registering section configured to obtain event-identification information and detailed information from an event-information registering server, the event-identification information identifying an event, the detailed information being on the event, to extract one or more first keywords from the obtained detailed information, and to register the one or more extracted first keywords and the event-identification information in relation to each other in the keyword storage.

(2) The server apparatus according to (1), further comprising:

a second keyword-registering section configured to obtain one or more comments from an SNS server, the one or more comments each including the one or more extracted first keywords, to extract one or more second keywords from the one or more obtained comments, and to register the one or more second keywords in relation to the event-identification information in the keyword storage.

(3) The server apparatus according to (1) or (2), wherein the event-information registering server is an EPG server managing an electronic program guide, and the first keyword-registering section is configured to obtain program identification information as the event-identification information from the EPG server, the program identification information identifying a program, and to obtain detailed information on the program as the detailed information.

(4) The server apparatus according to any one of (1) to (3), further comprising:

third keyword-registering section configured to obtain a first keyword-registering request from the information terminal, the first keyword-registering request including a comment-search keyword and the event-identification information, the comment-search keyword being input to search for a comment posted on the SNS server by a user, and to register, when obtaining the first keyword-registering request, the comment-search keyword and the event-identification information in relation to each other in the keyword storage, the comment-search keyword being included in the first keyword-registering request.

(5) The server apparatus according to any one of (1) to (4), further comprising:

a fourth keyword-registering section configured to obtain a second keyword-registering request from the information terminal, the second keyword-registering request including one or more keywords and the event-identification information, the one or more keywords being extracted from a comment posted on the SNS server by a user, and to register, when obtaining the second keyword-registering request, one or more keywords and the event-identification information in relation to each other in the keyword storage, the one or more keywords being extracted from the comment, the one or more keywords being included in the second keyword-registering request.

(6) The server apparatus according to any one of (1) to (5), wherein each of the first, second, third, and fourth keyword-registering sections is configured to register a keyword corresponding to the event in the keyword storage for each corner, the corner being obtained by temporally dividing one event.

(7) The server apparatus according to any one of (1) to (6), further comprising:
a keyword-ranking creating section configured
to count the registration-request number for each keyword in a past predetermined period for each event-identification information with reference to the keyword storage, and
to create a keyword ranking based on a predetermined number of top keywords; and
keyword ranking storage capable of storing the event-identification information and the keyword ranking in relation to each other, wherein
the keyword-ranking creating section is configured to register the created keyword ranking and the event-identification information in relation to each other in the keyword ranking storage.

(8) The server apparatus according to any one of (1) to (7), wherein
the keyword-ranking creating section is configured to create a keyword ranking corresponding to the event for each corner, the corner being obtained by temporally dividing one event.

(9) The server apparatus according to any one of (1) to (8), further comprising:
a keyword providing section configured
to receive a keyword-obtaining request from an information terminal, the keyword-obtaining request including event-identification information, the event-identification information identifying an event in which a user of the information terminal joins, and
to provide, when receiving the keyword-obtaining request, the event-identification information and the keyword to a keyword delivery server, the event-identification information and the keyword being registered in relation to each other in the keyword storage, the keyword delivery server being configured
to retrieve one or more keywords in relation to the event-identification information, and
to send the one or more keywords to the information terminal in reply, the one or more keywords being candidates for a comment-search keyword, the comment-search keyword being used to search for a comment posted on an SNS server.

(10) The server apparatus according to any one of (1) to (9), wherein
the keyword providing section is configured to provide the event-identification information and the keyword ranking to the keyword delivery server, the event-identification information and the keyword ranking being registered in relation to each other in the keyword ranking storage.

(11) An information terminal, comprising:
a keyword obtaining section configured to obtain one or more keywords, the one or more keywords being in relation to event-identification information, the event-identification information identifying an event in which a user joins, the one or more keywords being opened by a server apparatus, the server apparatus including
keyword storage capable of storing event-identification information and the one or more keywords in relation to each other, the event-identification information identifying an event, the one or more keywords relating to the event, and
a first keyword-registering section configured
to obtain event-identification information and detailed information from an event-information registering server, the event-identification information identifying an event, the detailed information being on the event,
to extract one or more first keywords from the obtained detailed information, and
to register the one or more extracted first keywords and the event-identification information in relation to each other in the keyword storage;
a providing section configured to provide the obtained keywords to a user, the keywords being candidates for a comment-search keyword, the comment-search keyword being used to search for a comment posted on an SNS server; and
a search request section configured to supply a search request to the SNS server, the search request including a comment-search keyword, the comment-search keyword being selected from the provided candidates by a user.

(12) The information terminal according to (11), wherein the keyword obtaining section is configured
to send a keyword-obtaining request to a keyword delivery server, the keyword-obtaining request including event-identification information, the event-identification information identifying the event in which a user joins, and
to obtain one or more keywords as candidates for a comment-search keyword, the one or more keywords relating to the event-identification information, the comment-search keyword being used to search for a comment posted on an SNS server.

(13) The information terminal according to (11) or (12), wherein
the keyword obtaining section is configured to obtain a keyword ranking from the keyword delivery server, the keyword ranking being created for each event-identification information based on a registration-request number for each keyword in a past predetermined period,
the providing section is configured to provide the keyword ranking to a user, the keyword ranking being obtained from the keyword delivery server, and
the search request section is configured to supply a search request to the SNS server, the search request including a comment-search keyword, the comment-search keyword being selected from the provided keyword ranking by a user.

(14) The information terminal according to any one of (11) to (13), further comprising:
a first keyword-registering request section configured to send a first keyword-registering request to the server apparatus, the first keyword-registering request including a comment-search keyword and event-identification information, the comment-search keyword being input to search for a comment posted on the SNS server by a user, the event-identification information identifying the event in which a user joins.

(15) The information terminal according to any one of (11) to (14), further comprising:
a second keyword-registering request section configured
to extract a keyword from a comment posted on the SNS server by a user, and
to send a second keyword-registering request to the server apparatus, the second keyword-registering request including the extracted keyword and the event-identification information.

(16) A program, causing a computer to function as
keyword storage capable of storing event-identification information and one or more keywords in relation to each other, the event-identification information identifying an event, the one or more keywords relating to the event; and a first keyword-registering section configured
to obtain event-identification information and detailed information from an event-information registering server, the event-identification information identifying an event, the detailed information being on the event,
to extract one or more first keywords from the obtained detailed information, and
to register the one or more extracted first keywords and the event-identification information in relation to each other in the keyword storage.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus, comprising:
keyword storage configured to store event-identification information and one or more keywords in relation to each other, the event-identification information identifying an event, the one or more keywords relating to the event;
keyword ranking storage configured to store the event-identification information and a keyword ranking in relation to each other; and
one or more processors configured to:
obtain the event-identification information and detailed information from an event-information registering server, the detailed information being on the event,
extract one or more first keywords from the obtained detailed information,
register the one or more extracted first keywords and the event-identification information in relation to each other in the keyword storage,
obtain one or more comments from a Social Networking Service (SNS) server, the one or more comments each including the one or more extracted first keywords,
extract one or more second keywords from the one or more obtained comments,
register the one or more second keywords in relation to the event-identification information in the keyword storage, and
register the keyword ranking and the event-identification information in relation to each other in the keyword ranking storage,
wherein the keyword ranking is created for a predetermined time period, wherein the predetermined time period is one of a first predetermined time period occurring from a time before a start of the event until the start of the event, a second predetermined time period occurring from an end of the event until a time after the end of the event, or a combination of the first predetermined time period and the second predetermined time period.

2. The server apparatus according to claim 1, wherein
the event-information registering server is an Electronic Program Guide (EPG) server managing an electronic program guide, and
the one or more processors are further configured to:
obtain program identification information as the event-identification information from the EPG server, the program identification information identifying a program, and
obtain detailed information on the program as the detailed information.

3. The server apparatus according to claim 2, wherein the one or more processors are configured to:
obtain a first keyword-registering request from an information terminal, the first keyword-registering request including a comment-search keyword and the event-identification information, the comment-search keyword being input to search for a comment posted on the SNS server by a user, and
register, in an event the first keyword-registering request is obtained, the comment-search keyword and the event-identification information in relation to each other in the keyword storage, the comment-search keyword being included in the first keyword-registering request.

4. The server apparatus according to claim 3, wherein the one or more processors are further configured to:
obtain a second keyword-registering request from the information terminal, the second keyword-registering request including one or more keywords and the event-identification information, the one or more keywords being extracted from a comment posted on the SNS server by a user, and
register, in an event the second keyword registering request is obtained, the one or more keywords and the event-identification information in relation to each other in the keyword storage, the one or more keywords being extracted from the comment, the one or more keywords being included in the second keyword-registering request.

5. The server apparatus according to claim 4, wherein the one or more processors are further configured to register a keyword corresponding to the event in the keyword storage for each of a plurality of corners, the each of the plurality of corners being obtained by temporally dividing one event.

6. The server apparatus according to claim 5, further comprising:
wherein the one or more processors are further configured to:
count a registration-request number for each keyword in a past predetermined period for each event-identification information with reference to the keyword storage, and
create the keyword ranking based on a predetermined number of top keywords.

7. The server apparatus according to claim 6, wherein the one or more processors are further configured to create the keyword ranking corresponding to the event for each corner, the each of the plurality of corners being obtained by temporally dividing one event.

8. The server apparatus according to claim 7, wherein the one or more processors are further configured to:
receive a keyword-obtaining request from the information terminal, the keyword-obtaining request including event-identification information, the event-identification information identifying an event in which a user of the information terminal joins, and
provide, in an event the keyword-obtaining request is received, the event-identification information and the keyword to a keyword delivery server, the event-identification information and the keyword being registered in relation to each other in the keyword storage, the keyword delivery server being configured to:
retrieve one or more keywords in relation to the event-identification information, and
send the one or more keywords to the information terminal in reply, the one or more keywords being candidates for the comment-search keyword, the comment-search keyword being used to search for a comment posted on the SNS server.

9. The server apparatus according to claim 8, wherein the one or more processors are further configured to provide the event-identification information and the keyword ranking to the keyword delivery server, the event-identification information and the keyword ranking being registered in relation to each other in the keyword ranking storage.

10. A non-transitory computer-readable storage medium having stored thereon, a set of computer-executable instructions for causing a computer to perform steps comprising:

- storing event-identification information and one or more keywords in relation to each other in a keyword storage, the event-identification information identifying an event, the one or more keywords relating to the event;
- storing the event-identification information and a keyword ranking in relation to each other in a keyword ranking storage;
- obtaining the event-identification information and detailed information from an event-information registering server, the event-identification information identifying the event, the detailed information being on the event;
- extracting one or more first keywords from the obtained detailed information;
- registering the one or more extracted first keywords and the event-identification information in relation to each other in the keyword storage;
- obtaining one or more comments from a Social Networking Service (SNS) server, the one or more comments each including the one or more extracted first keywords;
- extracting one or more second keywords from the one or more obtained comments;
- register the one or more second keywords in relation to the event-identification information in the keyword storage; and
- registering the keyword ranking and the event-identification information in relation to each other in the keyword ranking storage,
- wherein the keyword ranking is created for a predetermined time period, wherein the predetermined time period is one of a first predetermined time period occurring from a time before a start of the event until the start of the event, a second predetermined time period occurring from an end of the event until a time after the end of the event, or a combination of the first predetermined time period and the second predetermined time period.

* * * * *